United States Patent
Schauder et al.

(10) Patent No.: US 10,294,357 B2
(45) Date of Patent: May 21, 2019

(54) MULTI-MODAL POLYMER BLEND, HOT MELT ADHESIVE COMPRISING SAME AND USE THEREOF

(71) Applicants: ExxonMobil Chemical Patents Inc., Baytown, TX (US); Henkel AG & Co.-KgaA, Duesseldorf (DE)

(72) Inventors: Jean-Roch Schauder, Wavre (BE); Jean-Baptiste Milleret, Duesseldorf (DE); Gunter Hoffmann, Duesseldorf (DE); Eamonn Gallagher, Duesseldorf (DE)

(73) Assignees: EXXONMOBIL CHEMICAL PATENTS INC., Baytown, TX (US); HENKEL AG & CO.—KGAA, Duesseldorf (DE)

( * ) Notice: Subject to any disclaimer, the term of this patent is extended or adjusted under 35 U.S.C. 154(b) by 0 days.

(21) Appl. No.: 15/532,659

(22) PCT Filed: Dec. 1, 2015

(86) PCT No.: PCT/US2015/063160
§ 371 (c)(1),
(2) Date: Jun. 2, 2017

(87) PCT Pub. No.: WO2016/089851
PCT Pub. Date: Jun. 9, 2016

(65) Prior Publication Data
US 2017/0355841 A1   Dec. 14, 2017

Related U.S. Application Data

(60) Provisional application No. 62/087,312, filed on Dec. 4, 2014.

(51) Int. Cl.
C08L 23/14 (2006.01)
C09J 123/14 (2006.01)
C08L 91/06 (2006.01)

(52) U.S. Cl.
CPC ............ *C08L 23/14* (2013.01); *C08L 23/142* (2013.01); *C08L 91/06* (2013.01); *C09J 123/14* (2013.01); *C09J 123/142* (2013.01); *C08L 2205/025* (2013.01); *C08L 2205/03* (2013.01); *C08L 2207/10* (2013.01); *C08L 2314/06* (2013.01)

(58) Field of Classification Search
CPC ... C09J 123/142; C09J 123/14; C08L 23/142; C08L 23/14; C08L 91/06; C08L 2205/025; C08L 2207/10; C08L 2205/03; C08L 2314/06
See application file for complete search history.

(56) References Cited

U.S. PATENT DOCUMENTS

| | | |
|---|---|---|
| 4,997,572 A | 3/1991 | Wurtz |
| 5,201,230 A | 4/1993 | Sakakibara |
| 5,648,438 A | 7/1997 | Henry et al. |
| 6,525,157 B2 | 2/2003 | Cozewith et al. |
| 6,881,800 B2 | 4/2005 | Friedersdorf |
| 6,884,850 B2 | 4/2005 | Schauder et al. |
| 7,033,152 B2 | 4/2006 | Eloo et al. |
| 7,067,585 B2 | 6/2006 | Wang et al. |
| 7,226,553 B2 | 6/2007 | Jackson et al. |
| 7,232,871 B2 | 6/2007 | Datta et al. |
| 7,294,681 B2 | 11/2007 | Jiang et al. |
| 7,470,118 B2 | 12/2008 | Fukutani et al. |
| 7,524,910 B2 | 4/2009 | Jiang et al. |
| 7,601,666 B2 | 10/2009 | Rix et al. |
| 8,076,407 B2 | 12/2011 | Ellis et al. |
| 2002/0010302 A1 | 1/2002 | Takahashi et al. |
| 2004/0029980 A1 | 2/2004 | Stumphauzer et al. |
| 2005/0288412 A1 | 12/2005 | Hohner et al. |
| 2009/0118414 A1* | 5/2009 | Kitade et al. ........... C08F 10/00 524/451 |
| 2009/0203847 A1 | 8/2009 | Ellis et al. |
| 2010/0152360 A1* | 6/2010 | Jiang et al. ............. C08L 23/12 524/515 |
| 2013/0090421 A1 | 4/2013 | Bostik |
| 2013/0203900 A1 | 8/2013 | Ellis et al. |
| 2013/0225752 A1 | 8/2013 | Tse et al. |
| 2016/0200950 A1* | 7/2016 | Kalfus et al. .......... C09J 123/16 442/327 |

FOREIGN PATENT DOCUMENTS

| WO | WO-2012/051239 A1 | 4/2012 |
|---|---|---|
| WO | WO-2013/134038 A1 | 9/2013 |
| WO | WO 2014/058521 | 4/2014 |

* cited by examiner

*Primary Examiner* — Nathan M Nutter
(74) *Attorney, Agent, or Firm* — Polsinelli PC

(57) ABSTRACT

A multi-modal polymer blend of at least three fractions as determined by TREF is provided. The blend comprises a first propylene-based polymer, a second propylene-based polymer; and a third propylene-based polymer; wherein when subjected to TREF, the polymer blend exhibits: a first fraction that is soluble at −15° C. in xylene, the first fraction having an isotactic (mm) triad tacticity of about 55 mol % to about 85 mol %; a second fraction that is insoluble at −5 C in xylene or dichlorobenzene and soluble at 40° C. in xylene or dichlorobenzene; and a third fraction that is insoluble at 70° C. in xylene or dichlorobenzene and having an isotactic (mm) triad tacticity of about 85 mol % to about 98 mol %. Also provided are hot melt adhesive compositions comprising the polymer blend, tackifier, wax; and optionally a nucleating agent, articles containing the adhesive and methods of fabricating the articles.

20 Claims, 9 Drawing Sheets

MULTI-MODAL POLYMER BLEND, HOT MELT ADHESIVE COMPRISING SAME AND USE THEREOF

CROSS REFERENCE TO RELATED APPLICATIONS

This application is a National Phase filing under 35 U.S.C. § 371 of PCT/US2015/063160 filed on Dec. 1, 2015; and this application claims the benefit of U.S. Provisional Application No. 62/087,312 filed on Dec. 4, 2014 under 35 U.S.C. § 119. The entire contents of each application are hereby incorporated by reference.

TECHNICAL FIELD

The present disclosure relates to a multi-modal polymer blend. The present disclosure is also concerned with hot melt adhesives comprising one or more multi-modal polymer blends, at least one tackifier, at least one wax, optionally at least one nucleating agent, and optionally at least one plasticizer. The adhesives comprising the multi-modal polymer blends according to the present disclosure combine excellent adhesion at low temperatures and fast set times without the need of a functionalized wax to improve performance. The hot melt adhesives find particular use in packaging, converting, heat sealing, spout bonding and straw applications. It is appreciated that packaging articles may be useful as cartons, containers, crates, cases, corrugated cases, or trays, for example. More particularly, the packaging article may be useful as a cereal product, cracker product, drink packaging, frozen food product, just to name few exemplary uses. Additional non-packaging use examples include bookbinding and filter bonding. The disclosed adhesives are also suitable for pre-coating and related re-melting ("reactivation") end-uses, for example for bag closure and side-seam bonding.

BACKGROUND OF DISCLOSURE

Adhesive composition components, such as base polymers, tackifiers, and waxes are customarily provided as separate components for formulation into an adhesive composition. For hot melt adhesive (HMA) application systems, the base polymer is often supplied in the form of solid pellets, which may be melted and combined with the other adhesive components.

Hot melt adhesives used in packaging applications need to give high adhesion to different substrates across a wide temperature range from subzero temperatures to temperatures above room temperature. Those adhesives are typically used on packaging lines which have to operate at very fast speed where the residence time and hence the compression times of the parts to be glued together is very short. Accordingly, in order to be successful on these lines, adhesives need to have a short set time.

Because of short and long term availability of other commonly used raw materials, it is necessary to increase the amount of polymer used in hot melt adhesive formulations. Polymers based on ethylene and its copolymers have been used in hot melt adhesives for a number of years, offering by nature a fast setting speed. Unfortunately, the high viscosity of such polymers requires the use of additional costly raw materials in rather high amounts (typically above 50%).

Polypropylene and copolymers of propylene are also attractive because of the availability and cost of the monomers. Unfortunately polymers based on propylene typically provide either good adhesion and slow setting speed or poor adhesion but good setting speed. Although functionalized waxes (for example, maleic anhydride modified waxes) can be used to improve adhesion and/or setting speed, they have a negative impact on thermal stability and compromise operations at packaging lines due to adhesive charring in the adhesive melter and application nozzle plugging.

Ethylene vinyl acetate copolymers (EVA) have been suggested as the base polymer for adhesives because of their broad compatibility with other raw materials, level of performance and cost. Unfortunately, the thermal stability of EVA based products has limitations which lead to non-desirable machine downtime for cleaning or part replacement. Furthermore, EVA materials as well as other additives used in the formulation have fluctuating availability and pricing.

Propylene-based copolymers are preferred to EVA-based polymers as their better thermal stability can reduce machine downtime. A number of references suggest how to shorten setting time of this type of polymer but unfortunately the adhesion of such formulations is limited when it comes to difficult too bond substrates, for example: varnish boards. Exemplary base polymer compositions for HMA applications and methods for producing such base polymers are disclosed in U.S. Pat. Nos. 7,294,681 and 7,524,910 and WO 2013/134038, disclosures of which are incorporated herein by reference. Various polymers described in these patents and/or produced by the methods disclosed in these patents have been sold by ExxonMobil Chemical Company as LINXAR™ polymers.

In addition, metallocene ethylene-octene based adhesives have been commercially available for many years. Those adhesives have very short set time but are lacking in good adhesion at low temperature. Metallocene propylene-hexene based adhesives have also been commercially available. While these adhesives have a reasonably short set time, they too have poor adhesion, especially at low temperature.

Accordingly, a need exists for a propylene-based hot melt adhesive that possesses both good adhesion, including that at relatively low temperatures, and fast set times, without compromise of other features such as thermal stability and processability.

SUMMARY OF DISCLOSURE

It has been found according to the present disclosure, that certain multi-modal polymer blends of polymers and/or copolymers of propylene showing at least 3 fractions in a Temperature Rising Eluting Fractionation makes suitable hot melt adhesives having a high yet balanced level of adhesion and setting speed as well as improved thermal stability leading to less unwanted downtime on the processing equipment. In an embodiment, the multi-modal polymer blends have an elution temperature for the highest crystallinity polymer above 70° C.

An aspect of the present disclosure relates to a multi-modal polymer blend of at least three fractions as determined by Temperature Rising Elution Fractionation. The blend comprises:

a first propylene-based polymer, wherein the first propylene-based polymer is a homopolymer of propylene or a copolymer of propylene and at least one member selected from the group consisting of ethylene and a $C_4$ to $C_{20}$ alpha-olefin;

a second propylene-based polymer, wherein the second propylene-based polymer is a homopolymer of propylene or a copolymer of propylene and at least one member selected from the group consisting of ethylene and a $C_4$ to $C_{20}$ alpha-olefin; wherein the second propylene-based polymer is different than the first propylene-based polymer;

a third propylene-based polymer, wherein the second propylene-based polymer is a homopolymer of propylene or a copolymer of propylene and at least one member selected from the group consisting of ethylene and a $C_4$ to $C_{20}$ alpha-olefin; wherein the third propylene-based polymer is different than the first propylene-based polymer and the second propylene-based polymer;

wherein the multi-modal polymer blend has a Mw of about 5,000 g/mol to about 250,000 g/mol; and wherein, when subjected to Temperature Rising Elution Fractionation, the multi-modal polymer blend exhibits:

a first fraction that is soluble at −15° C. in xylene or dichlorobenzene, the first fraction having an isotactic (mm) triad tacticity of about 55 mol % to about 85 mol %;

a second fraction that is insoluble at −5° C. in xylene or dichlorobenzene and soluble at 40° C. in xylene or dichlorobenzene, and a third fraction that is insoluble at 70° C. in xylene or dichlorobenzene, the third fraction having an isotactic (mm) triad tacticity of about 85 mol % to about 98 mol %.

Another aspect of the present disclosure is concerned with a hot melt adhesive composition which comprises:

1) about 40 to about 97% by weight of the above disclosed multi-modal polymer blend;
2) about 1 to about 30% by weight of at least one tackifier;
3) about 1 to about 30% by weight of at least one wax;
4) optionally about 0.01 to about 0.5% by weight of at least one nucleating agent; and
5) optionally about 0.01 to about 5% by weight of at least one plasticizer;

wherein the respective % by weight is based on the total weight of the hot melt adhesive composition.

Still other objects and advantages of the present disclosure will become readily apparent by those skilled in the art from the following detailed description, wherein it is shown and described only the preferred embodiments, simply by way of illustration of the best mode. As will be realized, the disclosure is capable of other and different embodiments, and its several details are capable of modifications in various obvious respects, without departing from the disclosure. Accordingly, the description is to be regarded as illustrative in nature and not as restrictive.

BEST AND VARIOUS MODES FOR CARRYING OUT DISCLOSURE

The multi-modal polymer blends of the polymers and/or copolymers of propylene according to the present disclosure having at least 3 fractions in a temperature rising eluting fractionation makes possible the preparation of hot melt adhesives having a high, yet balanced, level of adhesion and setting speed as well as improved thermal stability leading to less unwanted downtime on customer machines. In an embodiment of the present invention, the multi-modal polymer blends have an elution temperature for the highest crystallinity polymer above 70° C. The multi-modal polymer blends according to the present disclosure can be prepared by processes disclosed in WO 2013/134038, disclosure of which is incorporated herein by reference.

Despite being multi-modal, the polymer species have been designed so their crystallization allows it to realize optimum adhesive performance. This can be seen in the difference of temperature for tan δ=1 between different polymer samples (please see examples below).

In an embodiment, the multi-modal polymer blends have at least three fractions as determined by Temperature Rising Elution Fractionation, said blend comprising:

a first propylene-based polymer, also referred to as first polymer in the following, wherein the first propylene-based polymer is a homopolymer of propylene or a copolymer of propylene and at least one member selected from the group consisting of ethylene and a $C_4$ to $C_{20}$ alpha-olefin;

a second propylene-based polymer, also referred to as second polymer in the following, wherein the second propylene-based polymer is a homopolymer of propylene or a copolymer of propylene and at least one member selected from the group consisting of ethylene and a $C_4$ to $C_{20}$ alpha-olefin; wherein the second propylene-based polymer is different than the first propylene-based polymer; and a third propylene-based polymer, also referred to as third polymer in the following, wherein the third propylene-based polymer is a homopolymer of propylene or a copolymer of propylene and at least one member selected from the group consisting of ethylene and a $C_4$ to $C_{20}$ alpha-olefin; wherein the third propylene-based polymer is different than the first propylene-based polymer and the second propylene-based polymer.

In an embodiment, the multi-modal polymer blend preferably has a Mw of about 5,000 g/mol to about 250,000 g/mol, more preferably a Mw of about 10,000 g/mol to about 150,000 g/mol, more preferably a Mw of about 20,000 g/mol to about 100,000 g/mol, and most preferably a Mw of about 20,000 g/mol to about 60,000 g/mol.

In an embodiment of the present invention, the multi-modal polymer blend preferably has a molecular weight distribution (MWD), also referred to as polydispersity index, of about 1.8 to about 3.5, more preferably a MWD of about 1.9 to about 3.2, and most preferably a MWD of about 2.0 to about 3.0.

Methods of Preparing Polyolefin Adhesive Components and Compositions

Figure 6:
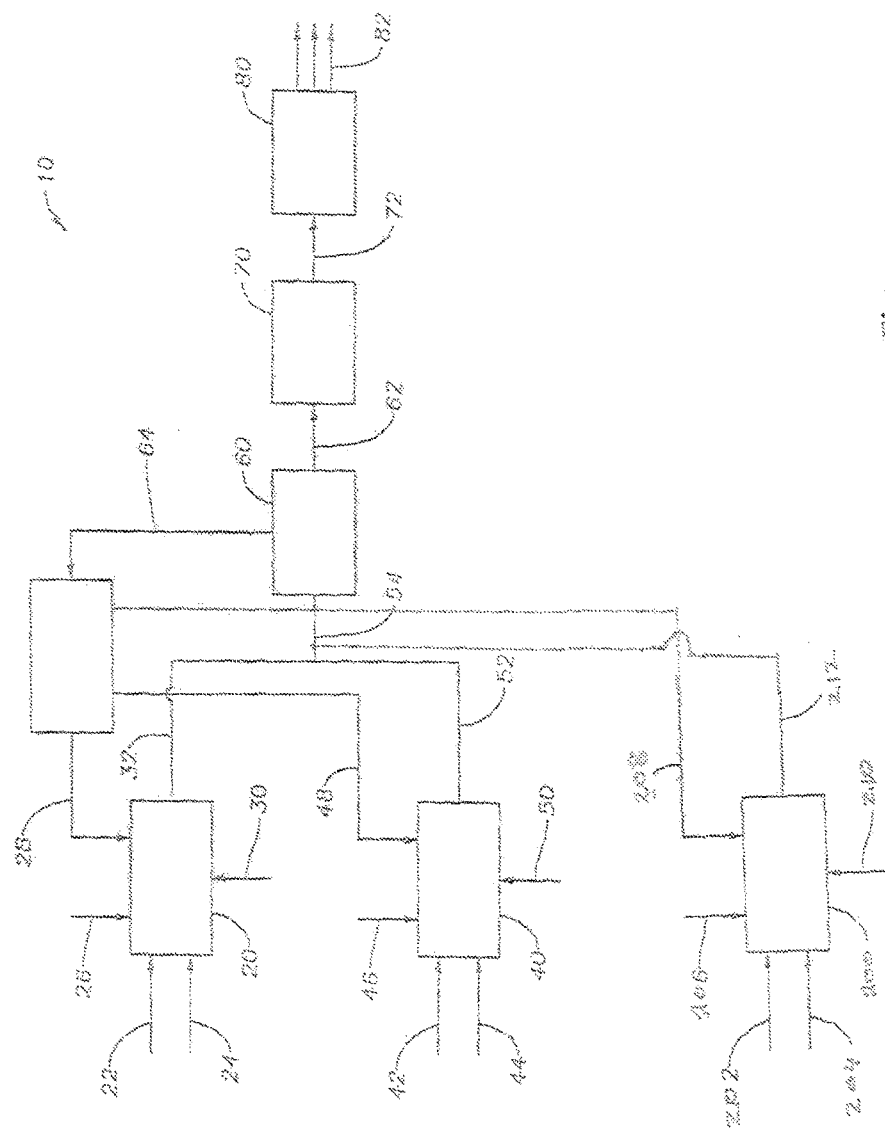
FIG. 6 illustrates a solution polymerization process for preparing polymer blends according to the present disclosure.

A solution polymerization process for preparing the multimodal polymers blend component is generally illustrated in FIG. 6. In an example embodiment, the process is performed by a system 10 that includes a first reactor 20, a second reactor 40 in parallel with the first reactor 20, a third reactor 200 in parallel with the first and second reactors, a liquid-phase separator 60, a devolatilizing vessel 70, and a pelletizer 80. The first reactor 20, second reactor 40 and third reactor 200 may be, for example, continuous stirred-tank reactors.

The first reactor 20 may receive a first monomer feed 22 of a first monomer, a second monomer feed 24 of a second monomer, and a catalyst feed 26 of a first catalyst. The first reactor 20 may also receive feeds of a solvent and an activator. The solvent and/or the activator feed may be combined with any of the first monomer feed 22, the second monomer feed 24, or catalyst feed 26 or the solvent and activator may be supplied to the reactor in separate feed streams 28, 30. A first polymer is produced in the first reactor 20 and is evacuated from the first reactor 20 via a first product stream 32. The first product stream 32 comprises the first polymer, solvent, and any unreacted monomer.

In any embodiment, the first monomer may be propylene and the second monomer may be ethylene and/or a $C_4$ to $C_{20}$ olefin. In a preferred embodiment, the second monomer may be ethylene, butene, hexene, octene or mixtures thereof. Generally, the choice of monomers and relative amounts of chosen monomers employed in the process depends on the desired properties of the first polymer and final multi-modal polymer blend. For adhesive compositions, ethylene and hexene are particularly preferred comonomers for copolymerization with propylene. In any embodiment, the relative amounts of propylene and comonomer supplied to the first reactor 20 may be designed to produce a polymer that is predominantly propylene, i.e., a polymer that is more than 50 mol % propylene. In another embodiment, the first reactor 20 may produce a homopolymer of propylene.

The second reactor 40 may receive a third monomer feed 42 of a third monomer, a fourth monomer feed 44 of a fourth monomer, and a catalyst feed 46 of a second catalyst. The second reactor 40 may also receive feeds of a solvent and activator. The solvent and/or the activator feed may be combined with any of the third monomer feed 42, the fourth monomer feed 44, or second catalyst feed 46, or the solvent and activator may be supplied to the reactor in separate feed streams 48, 50. A second polymer is produced in the second reactor 40 and is evacuated from the second reactor 40 via a second product stream 52. The second product stream 52 comprises the second polymer, solvent, and any unreacted monomer.

In any embodiment, the third monomer, i.e., the first monomer of the second propylene-based polymer, may be propylene and the fourth monomer, i.e., the second monomer of the second propylene-based polymer, may be ethylene and/or a $C_4$ to $C_{20}$ olefin. In an preferred embodiment, the fourth monomer may be ethylene, butene, hexene, octene or mixtures thereof. In any embodiment, the relative amounts of propylene and comonomer supplied to the second reactor 40 may be designed to produce a polymer that is predominantly propylene, i.e., a polymer that is more than 50 mol % propylene. In another embodiment, the second reactor 40 may produce a homopolymer of propylene.

The second polymer is different than the first polymer. The difference may be measured, for example, by the comonomer content, heat of fusion, melting temperature, branching index, weight average molecular weight, and/or polydispersity. In any embodiment, the second polymer may comprise a different comonomer than the first polymer or one polymer may be a homopolymer of propylene and the other polymer may comprise a copolymer of propylene and ethylene and/or a $C_4$ to $C_{20}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different melting temperature and/or heat of fusion than the first polymer. Specific examples of the types of polymers that may be combined to produce advantageous multi-modal blends are described in greater detail herein.

In an embodiment of the present invention, the multi-modal polymer may be produced in two or more reactors in series and/or parallel configuration. The third reactor 200 may receive a fifth monomer feed 202 of a fifth monomer, a sixth monomer feed 204 of a sixth monomer, and a catalyst feed 206 of a third catalyst. The third reactor 200 may also receive feeds of a solvent and activator. The solvent and/or the activator feed may be combined with any of the fifth monomer feed 202, the sixth monomer feed 204, or third catalyst feed 206, or the solvent and activator may be supplied to the reactor in separate feed streams 208, 210. A third polymer is produced in the third reactor 200 and is evacuated from the third reactor 200 via a third product stream 212. The third product stream 212 comprises the third polymer, solvent, and any unreacted monomer.

In any embodiment, the fifth monomer, i.e., the first monomer of the third propylene-based polymer, may be propylene and the sixth monomer, i.e., the second monomer of the third propylene-based polymer, may be ethylene and/or a $C_4$ to $C_{20}$ olefin. In any embodiment, the sixth monomer may be ethylene, butene, hexene, octene or mixtures thereof. In any embodiment, the relative amounts of propylene and comonomer supplied to the third reactor 200 may be designed to produce a polymer that is predominantly propylene, i.e., a polymer that is more than 50 mol % propylene. In another embodiment, the second reactor 200 may produce a homopolymer of propylene.

The third polymer is different than the first and second polymers. The difference may be measured, for example, by the comonomer content, heat of fusion, melting temperature, branching index, weight average molecular weight, and/or polydispersity. In any embodiment, the third polymer may comprise a different comonomer than the first/second polymer or one polymer may be a homopolymer of propylene and the other polymer may comprise a copolymer of propylene and ethylene and/or a $C_4$ to $C_{20}$ olefin. For example, the first/second polymer may comprise a propylene-ethylene copolymer and the third polymer may comprise a propylene-hexene copolymer. In any embodiment, the third polymer may have a different weight average molecular weight (Mw) than the first/second polymer and/or a different melt viscosity than the first/second polymer. Furthermore, in any embodiment, the third polymer may have a different melting temperature and/or heat of fusion than the first/second polymer. Specific examples of the types of polymers that may be combined to produce advantageous multi-modal blends are described in greater detail herein.

Although not illustrated in FIG. 6, it should be appreciated that any number of additional reactors may be employed to produce other polymers that may be integrated with (e.g., grafted) or blended with the first, second polymers and third polymers. In any embodiment, a fourth reactor may produce a fourth polymer. The fourth reactor may be in parallel with the first reactor 20, second reactor 40 and third reactor 200 or the third reactor may be in series with one of the first reactor 20, second reactor 40 and third reactor 200.

Further description of exemplary methods for polymerizing the polymers described herein may be found in U.S. Pat. No. 6,881,800, which is incorporated by reference herein.

The first product stream 32, second product stream 52 and third product stream 212 may be combined to produce a multi-modal blend stream 54. For example, the first product stream 32, second product stream 52 and third product stream 21 may supply the first, second and third polymers to a mixing vessel, such as a mixing tank with an agitator.

The multi-modal blend stream 54 may be fed to a liquid-phase separation vessel 60 to produce a polymer rich phase and a polymer lean phase. The polymer lean phase may comprise the solvent and be substantially free of polymer. As used herein, the term "substantially free" means that the polymer lean phase has less than 1.5 wt. % of polymer. At least a portion of the polymer lean phase may be evacuated from the liquid-phase separation vessel 60 via a solvent recirculation stream 64. The solvent recirculation stream 64 may further include unreacted monomer. At least a portion of the polymer rich phase may be evacuated from the liquid-phase separation vessel 60 via a polymer rich stream 62.

In any embodiment, the liquid-phase separation vessel 60 may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel 60.

Figure 3:
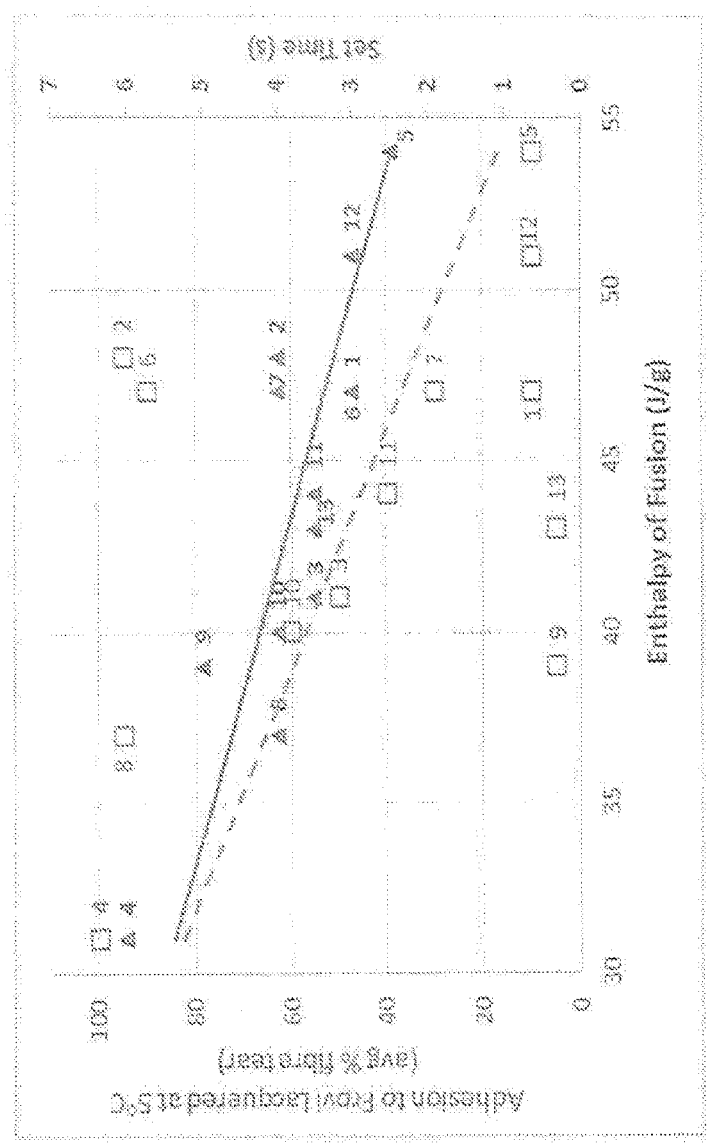
FIG. 3 shows the trend for adhesion potential and setting speed as a function of the total crystallinity of the polymers.

Liquid phase separation may be achieved by passing the multi-modal blend stream through a LCST boundary as illustrated in FIG. 3 of WO 2013/134038, entire disclosure of which is incorporated herein by reference.

In that illustrative example, polymerization takes place at 100 or 120 bar in the polymerization reactor(s) at the pressure also prevailing upstream of the pressure let-down device at a level as shown by line A. The temperature is maintained and/or raised to a range marked by the bracket shown at B to between 150° C. and 200° C. or 220° C. At the prevailing temperature, the pressure is dropped along the arrow to a level marked X. As the temperature is reduced across the let-down valve from 100 bar to 40 bar, the polymerization mixture passes from a homogeneous single phase, through the lower critical solution temperature boundary marked LCST, to a two-phase (L-L) region. That is, for a given temperature, the pressure starts at a pressure above the highest of the pressure-temperature curves representing the Upper Critical Solution Temperature (UCST), the LCST, and the vapor pressure, and the pressure after the let-down for the given temperature is below the pressure-temperature curve representing the spinodal boundary and above the pressure-temperature curve representing the vapor pressure. The pressure drop is sufficiently fast to avoid formation of a continuous polymer and to form a discontinuous solvent/monomer phase. The pressure drop across the region bounded by the LCST (binodal) boundary and the spinodal boundary may be especially rapid to induce phase separation by spinodal decomposition, which leads to rapid phase separation and settling.

Level X is above another phase boundary marked Vapor pressure below which the mixture enters a V-L-L region in which it is part vapor, and part two phase liquid. The pressure at level X at the exit of the separator is sufficiently high so that no vapor is formed.

It was determined according to WO 2013/134038 that employing a liquid-phase separation vessel 60 that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. It was also found that the concentration of polymer in the polymer lean phase may be further reduced by catalyst selection. Catalysts of Formula I (described in the Catalysts and Activators section of this disclosure), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Referring back to FIG. 6, upon exiting the liquid-phase separation vessel 60, the polymer rich stream 62 may then be fed to a devolatilizing vessel 70 for further polymer recovery. In any embodiment, the polymer rich stream 62 may also be fed to a low pressure separator before being fed to the inlet of the devolatilizing vessel 70. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream 72.

The devolatilizing vessel 70 may be a devolatilizing device that is known in the art. Any such device capable of removing solvent from a polymer melt to achieve the evaporative cooling described herein may be used. Certain of those devices are described in more detail below.

The provided apparatus and process use any suitable low oxygen content gas. Preferably, the low oxygen content gas has less than 3 wt. % oxygen, and more preferably less than 0.5 wt. % oxygen. Even more preferably, the low oxygen content gas is substantially free (less than 0.25 wt. %) or completely free (0.0 wt. %) of oxygen. Low oxygen content gases include conventional gases that do not contain oxygen, such as helium, argon, nitrogen, steam, carbon dioxide, or combinations thereof. Preferably, the low oxygen content gas is nitrogen.

Figure 2:
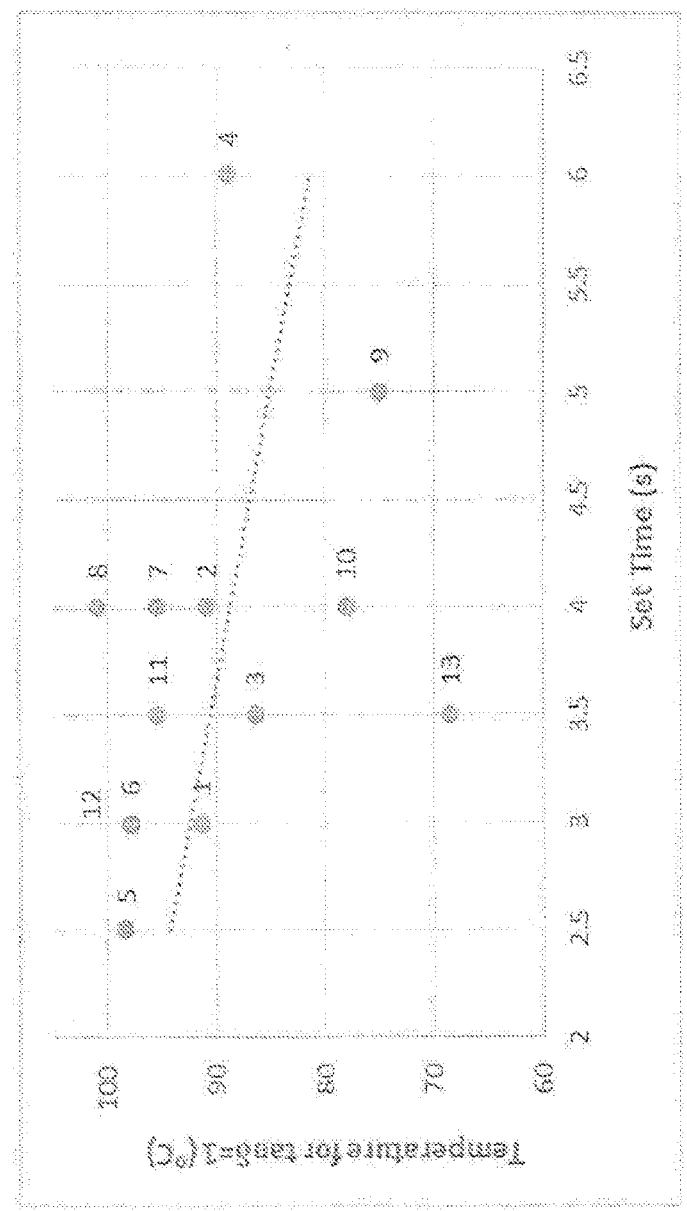
FIG. 2 illustrates the dependence of set time on the temperature at which the tan delta (transition from liquid to gel) is equal to 1; the higher the temperature, the shorter the set time. This temperature depends on the co-crystallization of the three polymer fractions in the blend according to the present disclosure.

The arrangement of an exemplary devolatilizer 70 suitable for use in the processes and systems of this disclosure is illustrated in FIG. 2 of WO 2013/134038, disclosure of which is incorporated herein by reference in its entirety. Further embodiments and a more detailed description of the operation of devolatilizing devices suitable for use herein may be found in U.S. patent Ser. No. 12/972,140, which is incorporated by reference herein in its entirety. Suitable devolatilizing devices are available commercially from, for example, LIST USA, Inc.

Referring back to FIG. 6, the cooled discharge stream 72 may then be fed to a pelletizer 80 where the multi-modal polymer blend is then discharged through a pelletization die as formed pellets 82. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. Examples of useful underwater pelletizing devices can be found in U.S. Pat. Nos. 7,033,152; 7,226,553 and 7,470,118, all of which are incorporated herein by reference.

In any embodiment, an underwater pelletizer may be used to pelletize the cooled polymer. In such embodiments, the polymer may be extruded through a pelletizing die to form strands, and the strands may then be cut by rotating cutter blades in the water box of the underwater pelletizer. Water may continuously flow through the water box to further cool and solidify the pellets and carry the pellets out of the underwater pelletizer's water box for further processing. In any embodiment, the temperature of the water in the underwater pelletizing unit may be from about 0° C. to 25° C. Preferably a water chilling system cools the water going to the underwater pelletizer water box (cutting chamber) to about 5° C.

In any embodiment, the pelletizing die may be thermally regulated by means known to those skilled in the art in order to prevent die hole freeze-off In any embodiment, the underwater pelletizer unit may have a chilled water slurry circulation loop. The chilled water helps eliminate the tendency of the pellets to stick together and allows the extruded polymer strands to be more cleanly cut. The chilled water slurry circulation loop may be fluidly connected with the water box of the underwater pelletizer, and may carry the pellet-water slurry to a pellet drying unit, and then recycle the water back to the underwater pelletizer. In any embodiment, the residence time of the pellets in the chilled water slurry circulation loop may be at least 10 seconds, or at least 20 seconds, or at least 30 seconds, or at least 40 seconds, or at least 50 seconds or more. Because fresh pellets may have a tendency to bridge and agglomerate if the pellets have not had adequate time to crystallize and harden, it is preferred that the pellets have sufficient residence time in the pellet water loop to harden. In the same or other embodiments, chilled water may be used to remove the pellets from the cutter blade and transports them through a screen that catches and removes coarsely aggregated or agglomerated pellets. The water may then transport the pellets through a dewatering device and into a centrifugal dryer or fluidized bed to remove excess surface moisture from the pellets. The pellets may then pass through a discharge chute for collection or may proceed to additional processing.

The pelletizing die can be used to make pellets in various shapes including, but not limited to, spheres, rods, slats, or polygons. Preferably, near spherical pellets are made. A pellet shape that will allow the pellets to easily flow is preferred.

The speed at which the pelletizer operates is selected according to the die plate size, number of orifices in the die, and the desired pellet size and shape. The number of orifices in the die and the orifice geometry are selected as appropriate for the polymer feed flow rate and melt material and such determinations are within the knowledge and capabilities of those skilled in the art.

Incomplete crystallization of the polymer material in the pellets after the pellets have exited the pellet-water slurry loop can lead to poor pellet geometry, pellet deformation, pellet aggregates formation and reduced ability of the pellets to freely flow. The degree of crystallization of the pellets is affected by residence time and temperature of the pellets. Additionally, the pellet hardness varies with residence time and temperature.

Optionally, an antiblocking agent may be added to the water in the underwater pelletizing water box or chilled water slurry loop. The addition of an antiblocking agent to the pellet water loop is useful to prevent pellets from sticking together in the loop.

A. Monomers

Polymers produced by any of the methods of the disclosure and/or employed in any of the compositions of the disclosure are preferably derived from one or more monomers selected from the group consisting of propylene, ethylene, $C_4$ to $C_{20}$ linear or branched olefins, and diolefins (particularly, $C_4$ to $C_{10}$ olefins). The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "monomer-derived unit". The polymer is predominantly propylene. Preferred comonomers include ethylene, butene, hexene, and octene, with ethylene being the most preferred comonomer. For the propylene-based polymers, the crystallinity and heat of fusion of the polymer are affected by the comonomer content and the sequence distribution of the comonomer within the polymer. Generally, increased levels of comonomer will reduce the crystallinity provided by the crystallization of stereoregular propylene-derived sequences.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128–1130. For a propylene ethylene copolymer containing greater than 75 wt. % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt. $\%=73.438-89.298X+15.637X^2$, where X is equal to $R/(R+1)$ with R being the ratio of the C3/C2 peak area ratio area at 1155 $cm^{-1}$ and at either 722 $cm^{-1}$ or 732 $cm^{-1}$, whichever is higher. For propylene/ethylene copolymers having 75 wt. % or less propylene content, the comonomer (ethylene) content can be measured using the procedure described in Wheeler and Willis.

Various test methods including GPC measurements methods and methods for determining ethylene content by NMR and the DSC measurements are described in U.S. Pat. No. 6,525,157 and U.S. Pat. No. 6,884,850, which are incorporated by reference herein in its entirety.

B. Catalysts and Activators

The triad tacticity and tacticity index of the polymer may be controlled by the catalyst, which influences the stereo regularity of the propylene placement, the polymerization temperature, according to which stereo regularity can be reduced by increasing the temperature, and by the type and amount of a comonomer, which tends to reduce the length of crystalline propylene derived sequences.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present disclosure. Catalyst systems of the present disclosure comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In any embodiment, the catalyst systems used for producing semi-crystalline polymers may comprise a metallocene compound. In any embodiment, the metallocene compound may be a bridged bisindenyl metallocene having the general formula (In1)Y(In2)MX2, where In1 and In2 are identical substituted or unsubstituted indenyl groups bound to M and bridged by Y, Y is a bridging group in which the number of atoms in the direct chain connecting In1 with In2 is from 1 to 8 and the direct chain comprises C, Si, or Ge; M is a Group 3, 4, 5, or 6 transition metal; and X2 are leaving groups. In1 and In2 may be substituted or unsubstituted. If In1 and In2 are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilyibis(indenyl) hafnium dimethyl and μ-dimethylsilylbis(indenyl) zirconium dimethyl.

In any embodiment, the metallocene compound may be a bridged bisindenyl metallocene having the general formula (In1)Y(In2)MX2, where In1 and In2 are identical 2,4-substituted indenyl groups bound to M and bridged by Y, Y is a bridging group in which the number of atoms in the direct chain connecting In1 with In2 is from 1 to 8 and the direct chain comprises C, Si, or Ge, M is a Group 3, 4, 5, or 6 transition metal, and X2 are leaving groups. In1 and In2 are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylpheny) indenyl) zirconium dimethyl, (dimethylsilyl)bis(2-methyl-4-(3,'5'-di-tert-butylphenyl) indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethyisilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulae disclosed in U.S. Pat. No. 7,601,666. Such metallocene compounds include, but are not limited to, dimethylsilyl bis(2-(methyl)-5,5,8,8-tetramethyl-10 5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) zirconium dichloride, and cyclo-propylsilylbis (2-(methyl)-5,5,8,8-tetramethyl-5,6,7,8-tetrahydrobenz(f)indenyl) hafnium dimethyl.

In any embodiment, the activators of the catalyst systems used to produce semi-crystalline polymers may comprise a cationic component. In any embodiment, the cationic component may have the formula $[R_1R_2R_3AH]^+$, where A is nitrogen, $R_1$ and $R_2$ are together a $—(CH_2)_a—$ group, where a is 3, 4, 5, or 6 and form, together with the nitrogen atom, a 4-, 5-,6-, or 7-membered non-aromatic ring to which, via adjacent ring carbon atoms, optionally one or more aromatic or heteroaromatic rings may be fused, and $R_3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]+$, where A is nitrogen, n is 2 or 3, and all Rs are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

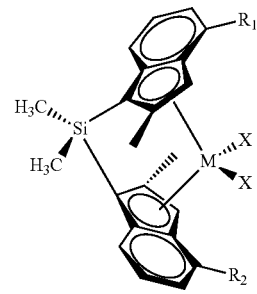

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, $R_1$ and $R_2$ may be independently selected from the group consisting of hydrogen, phenyl, and naphthyl. $R_1$ preferably the same as $R_2$. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Another advantageous catalyst that may be employed in any embodiment is illustrated in Formula II.

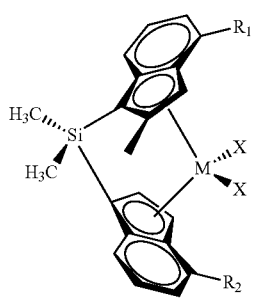

Formula II

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, $R_1$ and $R_2$ may be independently selected from the group consisting of hydrogen, phenyl, and naphthyl, $R_1$ is preferably the same as $R_2$. Particularly advantageous species of Formula II are dimethylsilylbis (indenyl) hafnium dimethyl, dimethylsilylbis (indenyl) hafnium dichloride, dimethylsilylbis (indenyl) zirconium dimethyl, and dimethylsilylbis (indenyl) zirconium dichloride.

In any embodiment, one or more of the polymers may also be produced using the catalyst illustrated in Formula III.

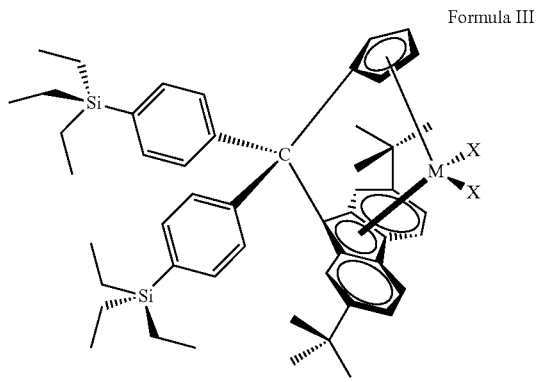

Formula III

In any embodiment, M is a Group IV transition metal atom, preferably a Group IV transition metal, more preferably hafnium or zirconium, and X are each an alkyl, preferably methyl, or a halide ion, preferably chloride or fluoride. Methyl or chloride leaving groups are most preferred. Particularly advantageous species of Formula III are 1,1'-bis(4-triethylsilylphenyl)methylene-(cyclopentadienyl)(2,7-di-tertiary-butyl-9-fluorenyl)hafnium dimethyl; 1,1'-bis(4-triethylsilylphenyl)methylene-(cyclopentadienyl)(2,7-di-tertiary-butyl-9-fluorenylhafnium dichloride; 1,1'-bis(4-triethylsilylphenyl)methylene-(cyclopentadienyl)(2,7-di-tertiary -butyl-9-fluorenyl)zirconium dimethyl; and 1,1'-bis (4-triethylsilylphenyl)methylene-(cyclopentadienyl) (2,7-di-tertiary-butyl-9-fluorenyl)zirconium dichloride.

Any catalyst system resulting from any combination of a metallocene compound, a cationic activator component, and an anionic activator component mentioned in this disclosure shall be considered to be explicitly disclosed herein and may be used in accordance with the present disclosure in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R4)4]^-$, where R4 is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbeniumtetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalysts of Formula I, Formula II, and Formula III. A particularly advantageous activator is dimethylaniliniumtetrakis (heptafluoronaphthyl) borate.

Suitable activators for the processes of the present disclosure also include aluminoxanes (or alumoxanes) and aluminum alkyls. Without being bound by theory, an alumoxane is typically believed to be an oligomeric aluminum compound represented by the general formula (Rx—Al—O)n, which is a cyclic compound, or Rx (Rx—Al—O) nAlRx2, which is a linear compound. Most commonly, alumoxane is believed to be a mixture of the cyclic and linear compounds. In the general alumoxane formula, Rx is independently a $C_1$-$C_{20}$ alkyl radical, for example, methyl, ethyl, propyl, butyl, pentyl, isomers thereof, and the like, and n is an integer from 1-50. In any embodiment, Rx may be methyl and n may be at least 4. Methyl alumoxane (MAO), as well as modified MAO containing some higher alkyl groups to improve solubility, ethyl alumoxane, isobutyl alumoxane, and the like are useful for the processes disclosed herein.

Further, the catalyst systems suitable for use in the present disclosure may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it, typical aluminum or boron alkyl components useful as scavengers are represented by the general formula $RxJZ_2$ where J is aluminum or boron, Rx is a $C_1$ to $C_{20}$ alkyl radical, for example, methyl, ethyl, propyl, butyl, pentyl, and isomers thereof, and each Z is independently Rx or a different univalent anionic ligand such as halogen (Cl, Br, I), alkoxide (ORx), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

C. Solvents

The solvent used in the reaction system of the present disclosure may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this disclosure. Particularly preferred solvents for use in the processes disclosed herein are n-hexane, isohexane, mixtures of hexane isomers and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt. % to about 50 wt. % solvent, or from about 5 wt. % to about 45 wt. % solvent, or from about 10 wt. % to about 40 wt. % solvent, or from about 10 wt. % to about 35 wt. % solvent.

D. Propylene-based Polymers used to Prepare the Multi-Modal Blend

The polymers that may be manufactured in the methods disclosed herein generally include any of the polymers formed of the monomers disclosed herein. Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{20}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes block, graft, random and alternating copolymers. The term "polymer" shall further include all possible geometrical configurations unless otherwise specifically stated. Such configurations may include isotactic, syndiotactic and random symmetries.

"Propylene-based" or "predominantly propylene-based" as used herein, is meant to include any polymer comprising propylene, either alone or in combination with one or more comonomers, in which propylene is the major component (i.e., greater than 50 mol % propylene). In any embodiment, one or more polymers of the blend may comprise one or more propylene-based polymers, which comprise propylene and from about 4 wt. % to about 10 wt. % of one or more comonomers selected from $C_2$ and $C_4$ to $C_{20}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin. In any embodiment, the one or more polymers of the blend may include at least about 4 wt. %, at least about 5 wt. %, at least about 6 wt. % ethylene-derived or hexene-derived units. In those or other embodiments, the copolymers may include up to about 6 wt. %, or up to about 7 wt. %, or up to about 8 wt. %, or up to about 9 wt. %, or up to about 10 wt. % ethylene-derived or hexene-derived units, where the percentage by weight is based upon the total weight of the propylene-derived and α-olefin derived units.

The polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. 5 to 10 mg polymer sample (pressed as a thin sheet) is inserted into the testing cell. The sample is heated up quickly (10° C./min) to 170° C., held at 170° C. for 5 minutes, until the temperature and heat flow signals are stable. The temperature is ramped down to −50° C. at 10° C./min (cooling cycle), held at −50° C. for 5 minutes, until signals are stable. The temperature is ramped up to 150° C. at 10° C./min ($2^{nd}$ heating cycle). The crystallization temperature (Tc) is measured during the cooling cycle; the melting temperature and enthalpy of fusion are measured during the $2^{nd}$ heating cycle.

In any embodiment, the polymers of the blend can show one or two melting peaks, as determined by DSC. The highest melting peak can have a Tm of less than about 130° C., less than about 125° C., or less than about 120° C. The second melting peak can have a Tm of less than about 70° C., or less than about 65° C.

In the following discussion, the terms "polymer(s)" and "semi-crystalline polymer(s)" refers to the first, second or third polymer or two of them or all of them of the present invention. In one or more embodiments, the crystallization temperature (Tc) of the polymer is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated.

The term "crystalline" as used herein broadly characterizes those polymers that possess a high degree of both inter and intra molecular order, and which preferably melt higher than 110° C., more preferably higher than 115° C., and most preferably above 120° C. The polymers suitable for use herein are said to be "semi-crystalline", meaning that in general they have a relatively low crystallinity. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, the heat of fusion (also referred to as Hf) is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable.

The semi-crystalline polymers used in specific embodiments of this disclosure preferably have a crystallinity of from 5% to 30% of the crystallinity of isotatic polypropylene. In further embodiments, the semi-crystalline polymers may have a crystallinity of from about 5% to about 25%, or from about 10% to about 20%, or from about 10% to about 15% of the crystallinity of isotactic polypropylene.

The semi-crystalline polymer can have a level of isotacticity expressed as percentage of isotactic triads (three consecutive propylene units), as measured by 13C NMR, of 75 mol % or greater, 80 mol % or greater, 85 mol % or greater, 90 mol % or greater, 92 mol % or greater, 95 mol % or greater, or 97 mol % or greater. In one or more other embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. In other embodiments, the traid tacticity may range from about 70 mol % to about 99 mol % or from 75 mol % to about 99 mol %. Triad tacticity is determined by the methods described in U.S. Patent Application Publication No. 2004/0236042.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature as measured per the ASTM D-792 test method.

In one or more embodiments, the semi-crystalline polymer can have a weight average molecular weight (Mw) of from about 5,000 to about 250,000 g/mol, or from about 7,500 to about 250,000 g/mol, or from about 10,000 to about 200,000 g/mol, or from about 25,000 to about 175,000 g/mol.

Weight-average molecular weight, Mw and molecular weight distribution (MWD) or Mw/Mn, where Mn, is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, 5 Macromolecules, Volume 34, Number 19, pp. 6812–6820, 2001.

Preparation of the solvent for the SEC experiment can be prepared by the method disclosed in WO 2013/134038, entire disclosure of which is incorporated herein by reference. Discussions of the calculation of concentration at each point in the chromatogram and the light scattering detector used, the molecular weight averages, number-average molecular weight, the SEC equipment, branching index g' and the viscosity-average molecular weight My can also be found in WO 2013/134038, entire disclosure of which is incorporated herein by reference.

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 eP, or from about 1,000 to about 10,000 cP, wherein 1 cP=1 mPa·sec.

Hot Melt Adhesive Composition

The present disclosure further relates to:

A hot melt adhesive composition, in the following also referred to as adhesive, which comprises:

1) about 40 to about 97% by weight of the multi-modal polymer blend;
2) about 1 to about 30% by weight of at least one tackifier;
3) about 1 to about 30% by weight of at least one wax;
4) optionally about 0.01 to about 0.5% by weight of at least one nucleating agent; and
5) optionally about 0.01% by weight to 5% by weight of at least one plasticizer, wherein the % by weight is based on the total weight of the hot melt adhesive composition.

The disclosure may also be understood with relation to the following specific embodiments:

The tackifier component may typically be present from about 1 wt. % to about 30 wt. %, and preferably from about 10 wt. % to about 25 wt. %, based on the total weight of the adhesive.

Typical tackifiers have Ring and Ball softening points, as determined by ASTM method E28, of about 70° C. to about 150° C., more preferably of about 95° C. to about 130° C.

Useful tackifiers may include any compatible resin or mixtures thereof such as copolymers and terpolymers of natured terpenes, including, for example, styrene/terpene and alpha methyl styrene/terpene; polyterpene resins having a softening point, as determined by ASTM method E28, of from about 70° C. to 150° C.; phenolic modified terpene resins and hydrogenated derivatives thereof including, for example, the resin product resulting from the condensation, in an acidic medium, of a bicyclic terpene and a phenol. Examples of commercially available phenolic modified terpene resins are Sylvares TP 2040 HM and Sylvares TP 300, both available from Arizona Chemical.

Preferred tackifiers are synthetic hydrocarbon resins. Included are aliphatic or cycloaliphatic hydrocarbons, aromatic hydrocarbons and the hydrogenated derivatives thereof, aromatically modified aliphatic or cycloaliphatic hydrocarbons and mixtures thereof; alicyclic petroleum hydrocarbon resins and the hydrogenated derivatives thereof; all having a Ball and Ring softening point of from about 70° C. to 135° C.). Examples of hydrogenated tackifiers particularly suitable include Escorez 5400 from Exxon Mobil Chemicals, Arkon P100 from Arakawa and Regalite S1100 from Eastman Chemical, and the like. Also included are the cyclic or acyclic C5 resins and aromatic modified acyclic or cyclic resins.

Non-limiting examples include aliphatic olefin derived resins such as those available from Goodyear under the Wingtack® Extra trade name and the Escorez® 1300 series from Exxon. A common C5 tackifying resin in this class is a diene-olefin copolymer of piperylene and 2-methyl-2-butene having a softening point of about 95° C. This resin is available commercially under the trade name Wingtack 95 Eastotac series from Eastman are also useful in the invention.

Also useful are aromatic hydrocarbon resins that are C9 aromatic/aliphatic olefin-derived and available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-105° C. and is commercially available from Cray Valley.

Alpha methyl styrene such as Kristalex 3085 and 3100 from Eastman Chemicals, Sylvares SA 100 from Arizona chemicals are also useful as tackifiers in the invention. Adhesives formulated with such alpha methyl styrenes have resultant viscosity of less than about 1500 mPas at 12° C. Mixtures of two or more described tackifying resins may be required for some formulations.

Small quantities of alkyl phenolic tackifiers can be blended with additional tackifier agents detailed above to improve the high temperature performance of these adhesives. Alkyl phenolics added in less than 20 wt. % of the total weight of the adhesive are compatible and in the proper combination increase high temperature adhesive performance. Alkyl phenolics are commercially available from Arakawa Chemical under the Tamanol trade name and in several product lines from Schenectady International.

The adhesive further comprises a wax or a mixture of waxes, typically a non-functionalized wax.

Non-functional waxes suitable for use in the present disclosure include paraffin waxes, microcrystalline waxes, polyethylene waxes, polypropylene waxes, by-product polyethylene waxes and Fischer-Tropsch waxes. High density low molecular weight polyethylene waxes, by-product polyethylene waxes and Fischer-Tropsch waxes are conventionally referred to in the art as synthetic high melting point waxes. Fischer-Tropsch waxes that can be used in the practice of the disclosure include but are not limited to Sasolwax® C80, Sasolwax®H1 and Sasolwax® H105 available from Sasol Limited, 1 Sturdee Ave, Rosebank, South Africa and Shell GTL Sarawax SX50, Shell GTL Sarawax SX70, Shell GTL Sarawax SX100 and Shell GTL Sarawax SX105 from Shell MDS, Menara Shell, No. 211 Jalan Tun Sambanthan, 50470 Kuala Lumpur. Functionalized waxes are not necessary for the adhesives embodied in this disclosure; however they may be used for commercial reasons. Such functionalized waxes include oxidized Fischer-Tropsch waxes and functionalized waxes such as hydroxy stearamide waxes and fatty amide waxes.

Paraffin waxes that can be used in the practice of the disclosure include Pacemaker® 30, 32, 35, 37, 40, 42, 45 & 53 available from Citgo Petroleum, Co.; Astor Okerin® 236 available from Honeywell; R-7152 Paraffin Wax available from Moore & Munger; R-2540 available from Moore and Munger; and other paraffinic waxes such as those available from Sasol Wax under the product designations Sasolwax 5603, 6203 and 6805.

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Baker Petrolite Corp.; Bareco® ES-796 Amber Wax, a 70° C. melt point wax available from Bareco; Besquare® 175 and 195 Amber Waxes and 80° C. and 90° C. melt point microcrystalline waxes both available from Baker Petrolite Corp.; Indramic® 91, a 90° C. melt point wax available from Industrial Raw Materials; and Petrowax® 9508 Light, a 90° C. melt point wax available from Petrowax. Other examples of microcrystalline waxes are Sasolwax 3971 available from Sasol Wax and Microwax K4001 available from Alfred Kochem GmbH.

Exemplary high density low molecular weight polyethylene waxes falling within this category include ethylene homopolymers available from Backer Petrolite Corp. as Polywax™ 500, Polywax™ 1500 and Polywax™ 2000. Polywax™. 2000 has a molecular weight of approximately 2000, an Mw/Mn of approximately 1.0, a density at 16° C. of about 0.97 g/cm$^3$, and a melting point of approximately 126° C.

Polypropylene waxes that can be used in the practice of the disclosure include but are not limited to Licocene® PP 1302, Licocene® PP 2602 and Licocene® PP 7502 TP from Clariant International Ltd Rothausstrasse 61, CH-4132 Muttenz, Switzerland, A-C® 1754, A-C® 1660 and A-C® 1089 from Honeywell international Inc, 101 Columbia Road Morristown N.J., 07962 and L-C 503NC from Lion Chemtech Co., Ltd. 36, Daedeok-daero 1277beon-gil, Daedeok-gu, Daejeon 306-220 Korea.

The wax may be present from about 1 wt. % to about 30 wt. %, and preferably from about 10 wt. % to about 25 wt. %, based on the total weight of the adhesive.

The adhesives of the present disclosure are preferably essentially free of functionalized waxes. The term "essentially free of functionalized waxes" as used herein refers to the presence of up to 0.1% by weight based upon the composition of a functionalized wax. Preferably less than 0.05% by weight and more preferably less than 0.01% by weight based upon the composition of a functionalized wax is present. The most preferred embodiments are entirely free of a functionalized wax.

Suitable nucleating agents are, for example, salts of organic acids, such as aliphatic monocarboxylic or dicarboxylic acids, examples being alkali metal, alkaline earth metal or aluminum salts of succinic acid, glutaric acid, caproic acid, montanic acid or corresponding salts of carboxylic acids containing aromatic groups, such as benzoic, alkylbenzoic, naphthoic, phenylacetic or cinnamic acid. Also suitable are adjuvants based on phosphoric acid, examples being alkali metal organophosphates. Also effective are ethylene-(meth)acrylic acid ionomers, examples being corresponding commercial products such as the grades from the Aclyn® range (commercial products from Honeywell) or from the Surlyn® range (commercial products from Dupont). Multiple amides components and their derivatives are also suitable as nucleators. Multiple amides components are compounds which have at least two amide functionalities on an aromatic or aliphatic core groups. Examples include aromatic tris amide derivatives such as 1,3,5-benzenetrisamide, N,N,N-tris-tert-butyl-1,3,5-benzenetricarboxamide, N,N,N-tris-cyclohexyl-1,3,5-benzenetricarboxamide, N,N,N-n-butyl-1,3,5-benzene-tricarboxamide, N,N,N-tris-isopropyl-1,3,5-benzenetricarboxamide, and the like, which are described in Frank Abraham et. al., Synthesis and Structure-Efficiency Relations of 1,3,5-Benzenetrisamides as Nucleating Agents and Clarifiers for Isotactic Poly(propylene), Macromol. Chem. Phys. 2010, 211, 171-181 and JINGBO WANG, et. al., Crystal Structure and in Morphologies of Polypropylene Homopolymer and Propylene-Ethylene Random Copolymer: Effect of the Substituted 1,3,5-Benzenetrisamides, Journal of Polymer Science: Part B: Polymer Physics, Vol. 46, 1067-1078 (2008). Aromatic tris amides are also commercially available as Irgaclear XT 386 and NJSTAR NU-100 (N,N'-dicyclohexyl-2,6-naphthalenendicarboxamide). Multiple amides components also includes aliphatic tris amides derivatives such as N,N',N''-tris(2-methylcyclohexyl)-1,2,3-propanetricarboxamide, available as RIKACLEAR PC1, and the like. Likewise, suitable are dibenzylidenesorbitol type, not only in the unsubstituted form but also in the singly or multiply alkyl-substituted form, methyl-substituted for example. Another suitable class of nucleators includes sugars or sugar alcohols of allose, altrose, fructose, galactose, glucose, gulose, idose, mannose, sorbose, talose, tagatose, arabinose, ribose, ribulose, xylose, xylulose, lyxose, erythrose, threose sorbitol, and xylitol. In a preferred embodiment, the nucleator is a clarifying agent. A clarifying agent is typically an organic, non-polymeric molecule that increases the polymer transparency by reducing the size of the polymer spherulites. Suitable clarifying agents include sorbitol derivatives, for example, 1,3,2,4 dibenzylidene sorbitol, 1,2,3,4-di-para-methylbenzylidene sorbitol, 1,2,3,4-di-meta, para-methylbenzylidene sorbitol, bis(4-propylbenzylidene) propyl sorbitol and mixtures thereof. The aforementioned clarifying agents are commercially available from Milliken Chemical under the trade names Millad and Hyperform HPN series, or Adeka Corporation's ADK STAB-NA series.

Preferably, the nucleating agent or a mixture of different nucleating agents is present from about 0.01 wt. % to about 0.5 wt. %, and more preferably about 0.05 wt. % to less than about 0.25 wt. % based on the total weight of the adhesive.

The adhesives of the present disclosure may optionally comprise plasticizers, stabilizers, additives or mixtures thereof. While a substantial range of such ingredients may be used, formulators should, of course, ensure the resulting adhesives comply with the regulatory requirements relevant to the intended end-use.

The adhesives of the present disclosure may desirably also contain a plasticizer, including oil. Suitable plasticizers include polybutenes, phthalates, benzoates, adipic esters and the like.

Particularly preferred plasticizers include phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils and derivatives. Preferred plasticizers include paraffinic oil, naphthenic oil, aromatic oil, long chain partial ether ester, alkyl monoesters, epoxidized oils, dialkyl diesters, aromatic diesters, alkyl ether monoester and mixtures thereof In one embodiment, the oil is typically present at about 1 to about 10 wt. %, more preferably 2 to 5 wt. %, based on the total weight of the adhesive. In some embodiments, however, oils may not be desired and is present at less than 5 wt. %, preferably less than 3 wt. %, more preferably less than 1 wt. %, more preferably less than 0.5 wt. % or even free of oil, based upon the total weight of the adhesive.

The adhesives of the present may desirably also contain at least one stabilizer and/or at least one antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include Irganox® 565, 1010, 1076 and 1726 which are hindered phenols. These are primary antioxidants which act as radical scavengers and may be used alone or in combination with other antioxidants such as phosphite antioxidants like Irgafos®168 available from Ciba Specialty Chemicals. Phosphite catalysts are considered secondary catalysts and are not generally used alone. These are primarily used as peroxide decomposers. Other available catalysts are Cyanox® LTDP available from Cytec Industries and Ethanox® 330 available from Albemarle Corp. Many such antioxidants are available either to be used alone or in combination with other such antioxidants. These compounds can be added to the adhesive in small amounts, typically less than about 1 wt. %, and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as pigments, dyestuffs and fillers conventionally added to hot melt adhesives may be incorporated in minor amounts, i.e., up to about 10% by weight, into the adhesives of the present disclosure.

The adhesives of the present disclosure are prepared by blending the components in a melt at a temperature above about 180° C. to form a homogeneous blend. Various methods of blending are known in the art and any method that produces a homogeneous blend, including extrusion process, is satisfactory. The blend is then cooled and may be formed into pellets or blocks for storage or shipping. These pre-formed adhesives can then be reheated to apply onto substrates.

Furthermore, the present invention relates to:

A method for manufacturing an article according to the present invention, which comprises (1) heating the hot melt adhesive composition to a temperature where it is completely molten;

(2) applying the hot melt adhesive composition to at least one surface of a first substrate to form an adhesive layer on the at least one surface of the first substrate, wherein said at least one surface is partly or completely covered by the adhesive layer; and (3) solidifying the adhesive layer by actively cooling it or allowing it to cool to room temperature.

In a preferred embodiment after step (2), a second substrate is brought into contact with the hot melt adhesive layer on the first substrate.

In another preferred embodiment, after step (2) the surface of the hot melt adhesive is remelted ("reactivated"), a second substrate is then brought into contact with the hot melt adhesive layer on the first substrate and solidified by actively cooling or allowing to cool to room temperature.

In preferred embodiments of the disclosure the first and the second substrates can be similar or dissimilar substrates.

Preferred substrates to be bonded include virgin and recycled kraft, high and low density kraft, chipboard and various types of treated and coated kraft. Composite materials can also be used for packaging applications. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials; find utility in the packaging industry.

The hot melt adhesive compositions of the disclosure find use in, for example, packaging, converting, straw attachment and spout bonding applications, e.g., on liquid packaging boards, heat sealing, e.g. for bag closure and side seam bonding, coating, e.g. pre-coating and related reactivation steps, tightening of glue lines, bookbinding and filter assembly. The adhesives find particular use as case, carton, and tray forming adhesives, and as sealing adhesives, including heat sealing applications, for example in the packaging of cereals, cracker and beer products. Encompassed by the disclosure are containers, e.g., cartons, cases, boxes, folding boxes, bags, trays, filters, bookbinding and the like, wherein the adhesive is applied by the manufacturer thereof prior to shipment to the packager. Following packaging, the container is heat sealed.

All polymers used to prepare the adhesives described in table 1 have the same Mw (~30,000 g/mol) and crystallinity within an enthalpy of fusion range from 31 J/g to 54 J/g. and show at least 3 fractions by TREF; the percentage of the 3 fractions and the elution temperature of the crystalline fraction are different.

The polymers according to the present disclosure provide for a high level of adhesion performance achieved at fast setting speed. They exhibit improved thermal stability over EVA and PP plus functionalized wax based hot melt adhesives, which is realizable as reduced machine downtime. The polymers according to the present disclosure provide for a high level of performance delivered at lower coat weight compared to EVA based products based on density differences and reduced dependency on critical raw materials.

Exemplary embodiments according to the present disclosure:

Embodiment 1. A multi-modal polymer blend of at least three fractions as determined by Temperature Rising Elution Fractionation, said blend comprising:

a first propylene-based polymer, wherein the first propylene-based polymer is a homopolymer of propylene or a copolymer of propylene and at least one member selected from the group consisting of ethylene and a $C_4$ to $C_{20}$ alpha-olefin;

a second propylene-based polymer, wherein the second propylene-based polymer is a homopolymer of propylene or a copolymer of propylene and at least one member selected from the group consisting of ethylene and a $C_4$ to $C_{20}$ alpha-olefin; wherein the second propylene-based polymer is different than the first propylene-based polymer;

a third propylene-based polymer, wherein the third propylene-based polymer is a homopolymer of propylene or a copolymer of propylene and at least one member selected from the group consisting of ethylene and a $C_4$ to $C_{20}$ alpha-olefin; wherein the third propylene-based polymer is different than the first propylene-based polymer and the second propylene-based polymer;

wherein the multi-modal polymer blend has a Mw of about 5000 g/mol to about 250,000 g/mol; and wherein, when subjected to Temperature Rising Elution Fractionation, the multi-modal polymer blend exhibits:

a first fraction that is soluble at −15° C. in xylene or dichlorobenzene, the first fraction having an isotactic (mm) triad tacticity of about 55 mol % to about 85 mol %;

a second fraction that is insoluble at −5° C. in xylene or dichlorobenzene and soluble at 40° C. in xylene or dichlorobenzene, and a third fraction that is insoluble at 70° C. in xylene or dichlorobenzene the third fraction having an isotactic (mm) triad tacticity of about 85 mol % to about 98 mol %.

Embodiment 2. The multi-modal polymer blend according to Embodiment 1, which has a first fraction that is soluble at −15° C. accounting for at least 50 weight % of the multi-modal polymer.

Embodiment 3. The multi-modal polymer blend according to Embodiment 1 or 2, which has a Mw of about 10,000 g/mol to about 150,000 g/mol.

Embodiment 4. The multi-modal polymer blend according to Embodiment 1 or 2, which has a Mw of about 20000 g/mol to about 60,000 g/mol.

Embodiment 5. The multi-modal polymer blend according to any one of Embodiments 1, 2, 3 or 4, which has a MWD of about 1.8 to about 3.5.

Embodiment 6. The multi-modal polymer blend according to any one of Embodiments 1, 2, 3 or 4, which has a MWD of about 1.9 to about 3.2.

Embodiment 7. The multi-modal polymer blend according to any one of Embodiments 1, 2, 3 or 4, which has a MWD of about 2 to about 3.0.

Embodiment 8. The multi-modal polymer blend according to any one of Embodiments 1, 2, 3, 4, 5, 6 or 7, which is a three reactor blend.

Embodiment 9. The multi-modal polymer blend according to according to any one of Embodiments 1, 2, 3, 4, 5, 6, 7 or 8, which is a solution blend.

Embodiment 10. The multi-modal polymer blend according to according to any one of Embodiments 1, 2, 3, 4, 5, 6, 7, 8 or 9, which is in the form of polymeric pellet.

Embodiment 11. The multi-modal polymer blend according to according to any one of Embodiments 1, 2, 3, 4, 5, 6, 7, 8, 9 or 10, wherein the first propylene-based polymer comprises a copolymer of propylene and ethylene, the second propylene-based polymer comprises a copolymer of propylene and ethylene, and the third propylene-based polymer comprises a copolymer of propylene and ethylene.

Embodiment 12. A hot melt adhesive composition which comprises:
1) about 40 to about 97% by weight of the multi-modal polymer blend according to any one of Embodiments 1, 2, 3, 4, 5, 6, 7, 8, 9, 10 or 11;
2) about 1 to about 30% by weight of at least one tackifier;
3) about 1 to about 30% by weight of at least one wax;
4) optionally about 0.01 to about 0.5% by weight of at least one nucleating agent; and
5) optionally about 0.01% by weight to 5% by weight of at least one plasticizer,
wherein the % by weight is based on the total weight of the hot melt adhesive composition.

Embodiment 13. The hot melt adhesive composition according to Embodiment 12, wherein the multi-modal polymer blend has a MWD of about 1.8 to about 3.5.

Embodiment 14. The hot melt adhesive composition according to Embodiment 12 or 13, which further comprises an antioxidant present in an amount of about 0.01 to about 1 wt. % of the hot melt adhesive composition.

Embodiment 15. An article comprising at least one substrate and a hot melt composition according to any one of Embodiments 12, 13, or 14.

Embodiment 16. The article according to Embodiment 15, wherein the article comprises a first substrate and a second substrate, wherein the first substrate and a second substrate are bonded together by the hot melt adhesive composition, being interposed between the first substrate and a second substrate.

Embodiment 17. The article according to Embodiment 15 or 16, wherein the article is used for packaging, straw attachment, spout bonding, bag closing, coating and bookbinding applications.

Embodiment 18. A method for manufacturing an article according to any one of Embodiments 15, 6 or 17, which comprises
(1) heating the hot melt adhesive composition to a temperature where it is completely molten;
(2) applying the hot melt adhesive composition to at least one surface of a first substrate to form an adhesive layer on the at least one surface of the first substrate, wherein said at least one surface is partly or completely covered by the adhesive layer; and
(3) solidifying the adhesive layer by actively cooling it or allowing it to cool to room temperature.

Embodiment 19. The method according to Embodiment 18, wherein after step (2), a second substrate is brought into contact with the hot melt adhesive layer on the first substrate.

Embodiment 20: The method according to Embodiment 18, wherein after step (3), the non-bonded adhesive surface is re-melted ("reactivated"), a second substrate is brought into contact with the hot melt adhesive layer on the first substrate and again allowed to solidify by actively cooling or allowing to cool to room temperature.

Sample Preparation and Test Methods

Sample Preparation:

The polymer was heated up to about 180° C. to 200° C. until molten. Once molten, it was stirred using a tri blade propeller stirrer at between 200 and 400 rpm for 10 to 20 minutes. The other components were mixed together and added to the molten polymer in thirds at regular time interval. For samples containing a nucleating agent, this component was added first and the other components were only added after the nucleating agent had been dispersed for about 15 to 25 minutes.

Softening Point:

The softening points of the samples were measured using a Mettler-Toledo dropping point measuring cell. In this test, the molten adhesive sample is poured into a metal ring. After at least 24 hours of conditioning at room temperature, a ring is placed in the measuring cell and heated up at 2° C./min from 60° C. to a maximum temperature of 160° C. The softening point of the sample is recorded when the material becomes fluid enough to flow through the bottom opening of the ring and cut a laser beam detector. The values reported are averages based on two individual measurements.

Viscosity:

The melt viscosity in mPa·s was measured with a Brookfield Thermosel RVT viscometer at the temperature given using a No. 27 spindle at a speed of 100 rpm.

Adhesion:

Adhesion potential was determined by applying a 2 mm wide bead of molten adhesive at 180° C. to a 25 mm*40 mm piece of substrate, and immediately bringing it into contact with a second piece of substrate. A 100 gram weight was immediately placed on the top of the bond for 3 seconds to provide compression. The specimens prepared were conditioned at different temperatures for 24 hours. The bonds were separated by hand and the resulting fiber tear was recorded. The reported percent fiber tear value is an average based on three specimens.

Heat Resistance:

As described in patent US 2009/0203847, heat stress is defined as being the temperature at which a stressed bond fails. In the examples that follow, heat stress, or the ability of a hot melt to withstand elevated temperature under cleavage forces (also referred to herein as cleavage heat stress), was used to measure heat resistance.

Figure 7:
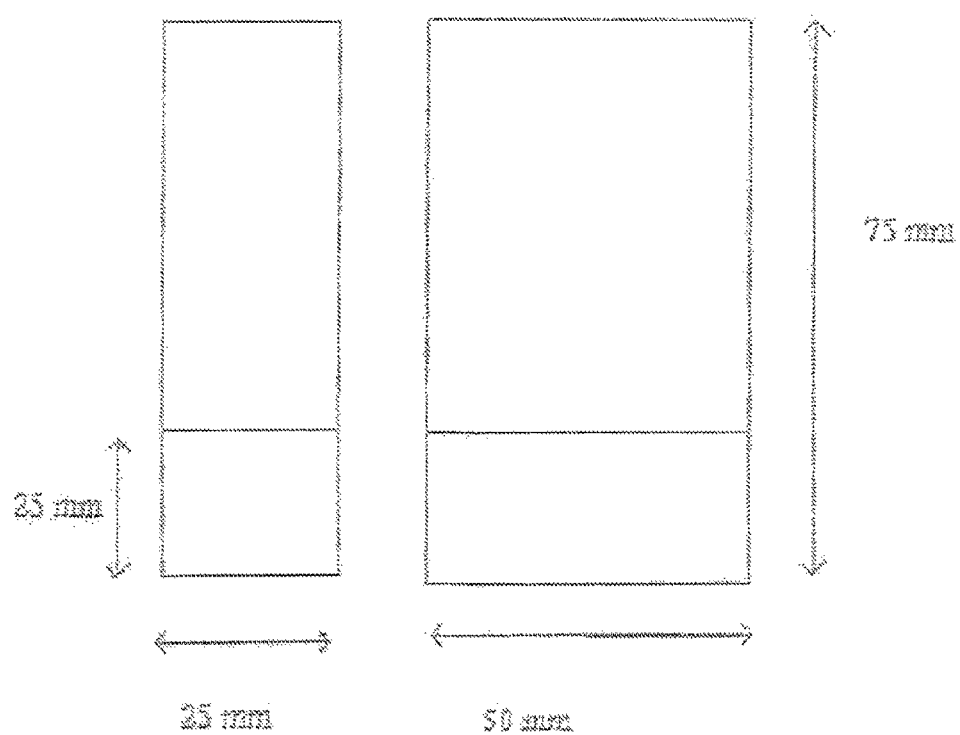
FIGS. 7, 8, and 9 illustrate steps in heat stress testing of hot melt compositions.

1. Four pieces of board 75 mm*25 mm and 75 mm*50 mm were cut from corrugated board with the fluting running parallel to the longest edge. On both sides of each board a line was drawn 25 mm from the end as indicated in FIG. 7.

2. Approximately 100 g of hot melt in a small metal container was heated at the application temperature, 180-185° C.

3. The adhesive was stirred with a spatula to ensure even heat distribution; the spatula was then lifted out of the adhesive to produce a stream of adhesive in the container. This process was repeated for each sample.

4. The 50 mm board was passed under the stream of adhesive to give a bead width of about 2 mm along the 25 mm line as shown in FIG. 7 (the speed with which the board moved determined the bead width and the typical speed was about 2 m/sec).

Figure 8:
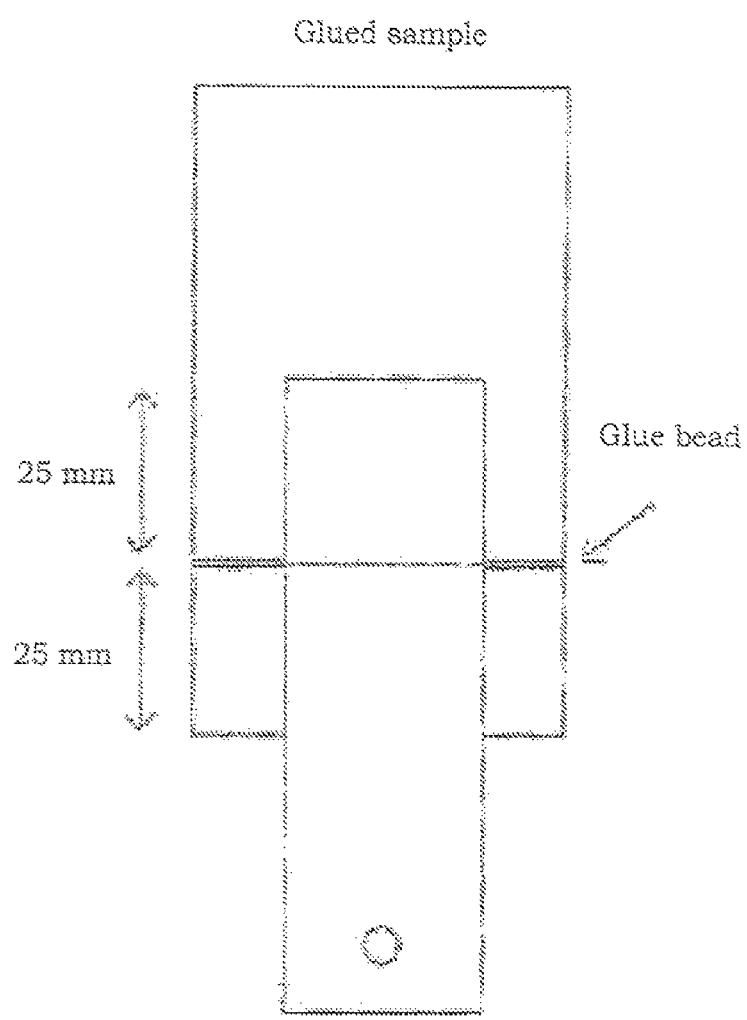

5. The 25 mm wide board was taken and bonded same side to same side lining up 25 mm mark to that of 50 mm board's 25 mm mark as shown in FIG. 8. The 25 mm board was positioned in the center of the 50 mm board leaving uncompressed hot melt adhesive on either side.

6. The bond was formed within 3 seconds and a 100 g weight placed on the bond area to ensure even bonding pressure. The bond was left at least 24 hours before testing.

Figure 9:
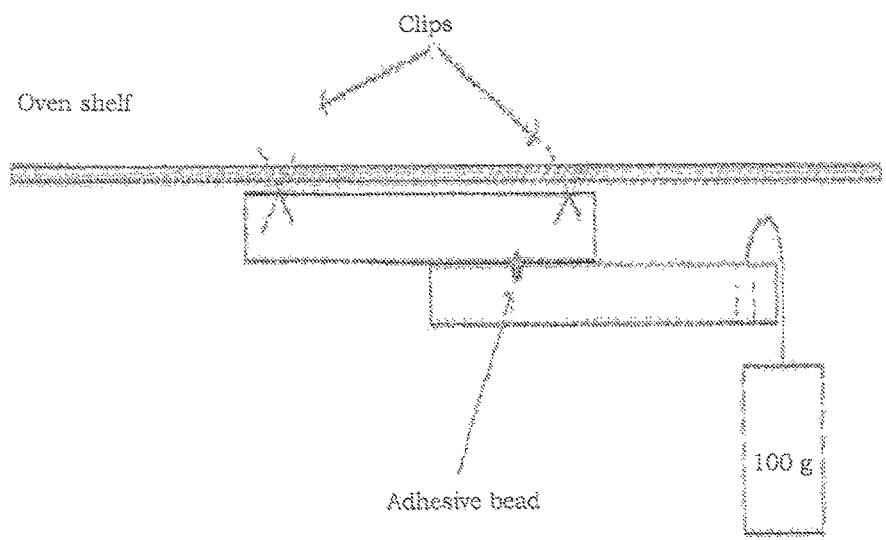

7. The 25 mm board end of the bonded sample was hole-punched to allow a 100 g weight to be hung from it. The sample was attached by the 50 mm piece of board in an oven so that it was horizontal to the oven shelf with the 25 mm board facing down using four bulldog clips and a 100 g weight was attached to it as shown FIG. 9.

8. The oven was turned on and set at a temperature of 40° C. and left for 20 minutes. The oven temperature after the initial 20 minutes was raised by 3° C. every 15 minutes. The oven temperature noted when the sample fails represents the heat resistance of the sample. The reported heat resistance value is an average value, based on 4 specimens.

Setting Speed:

Set-time is defined as the amount of time the substrates must be compressed together before they can be released. A bond held shorter than the set time may open up or be of inadequate strength. A bond held for the required set time or longer will deliver full adhesive properties. The set-time was measured using the method as described in U.S. Pat. No. 5,201,230. The set-time is an average value, based on 3 tests.

A bead of adhesive was applied to a cardboard substrate traveling on a belt moving at 30 m/s.

The application temperature of the adhesive was 180° C. After an open time of 1 second, another cardboard substrate was applied to the first substrate with a force of 1 kg. The two substrates were held together for a predetermined time, known as "set-time," and then separated with maximum force.

Adhesion tests show that the use of the polymers according to the present disclosure resulted in 50 to 100% fibre tear on lacquered substrate at 5° C. and in 70 to 100% fibre tear on lacquered substrate at 5° C. for the preferred compositions. Setting speed tests show that the use of polymers according to the present disclosure took less than 8 seconds to generate 100% fibre tear and less than 4 seconds to generate 100% fibre tear for the preferred compositions.

Comparative Example 1

Adhesives developed with C3/C6 based copolymers, delivering fast setting speed but average adhesion. Examples can be found in Henkel's commercial adhesives Technomelt Supra range among others.

Figure 1:
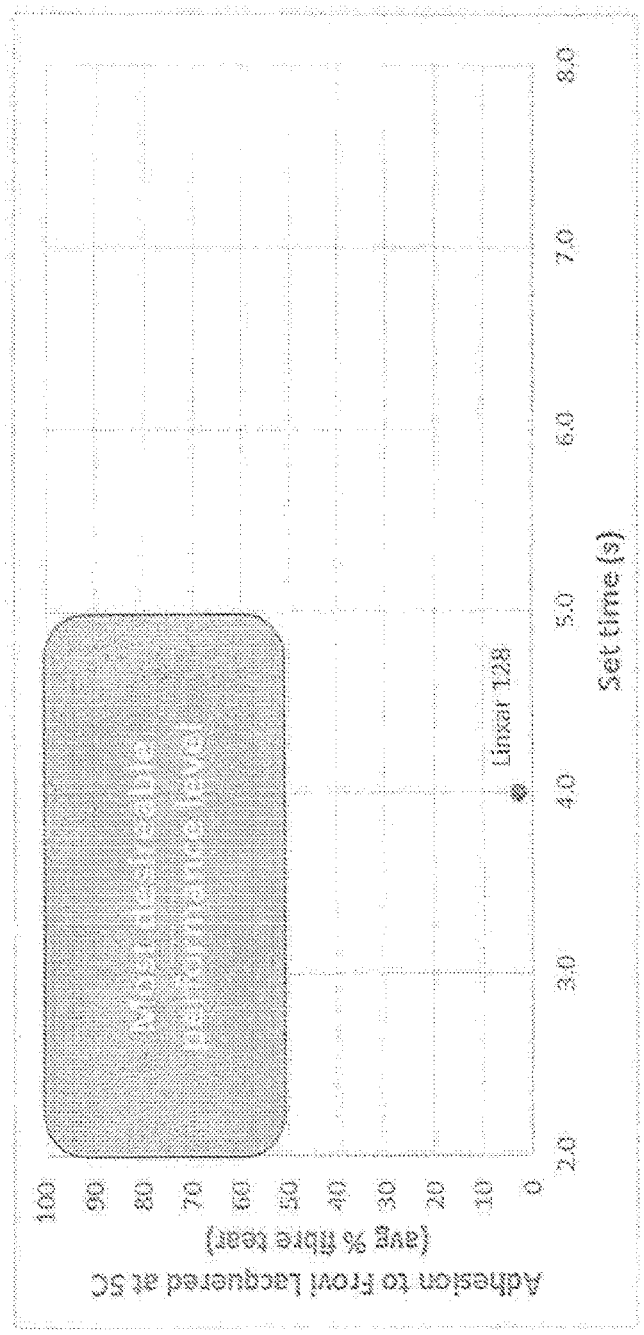
FIG. 1 shows the level of performance of an adhesive based on a commercially available C3/C6 copolymer in comparison to a preferred application performance range.

FIG. 1 shows the level of performance of an adhesive based on a commercially available C3/C6 copolymer, Linxar 128. Fast setting speed (less than 4 seconds) can be achieved; the adhesion performance on difficult substrates is insufficient. APAO (atactic poly-alpha) polymers would deliver good adhesion, but they are not well suited for this application because they need too long to set. Lowering the set time of such APAOs would require costly additives.

Example 2

This series of experiments was created to show the impact of various parameters of polymer design. All polymers from this table are propylene ethylene copolymers and have a similar MW of about 30,000 g/mol. In Table 1, both polymer properties and adhesive performance data are shown for Samples 1-13. For each Sample, an identical quantity of polymer (showing three fractions in different ratios as well as having different crystallinities and different molecular weight distributions as shown in the table) was included in a consistent adhesive formulation, ensuring that polymer characteristics were the only variable in each case. The adhesive formulation used is indicated in Table 2, sample 21. Samples 5 and 8 have a crystalline fraction eluting at higher temperature and show Tan δ=1 at higher temperature (per FIG. 2), leading to a shorter set time.

Polymer sample 10 from Table 1 has a percentage of isotactic triads of 77 mol %. This polymer was fractionated by TREF; the first fraction that is soluble at −15° C. has an isotactic (mm) triad tacticity of 61 mole % and the third fraction which is insoluble at 70° C. has an isotactic (mm) triad tacticity of 87 mole %.

FIG. 3 shows the trend for adhesion potential and setting speed as a function of the total crystallinity of the polymers. The plain trend line and triangles correspond to set time when the dashed trend trend line and squares correspond to Adhesion.

Figure 4:
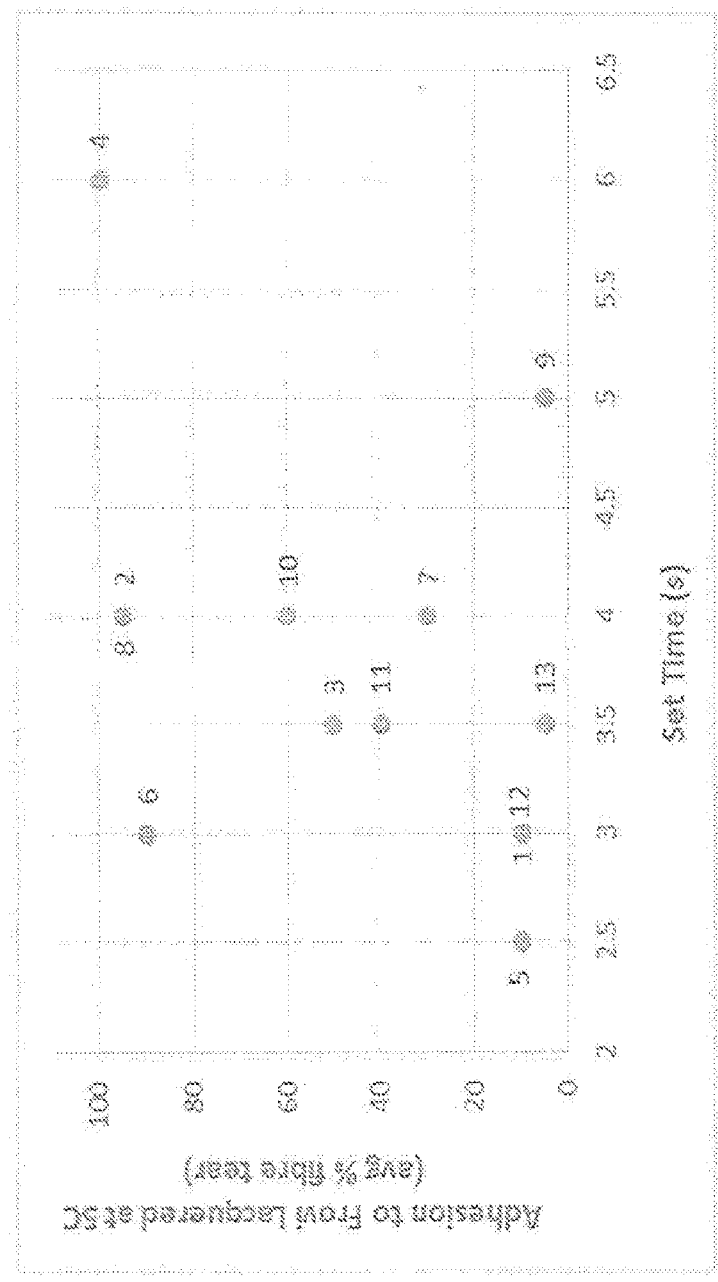
FIG. 4 shows that polymer blends according to the present disclosure can be used to achieve a balanced level of adhesion and setting speed.
Figure 5:
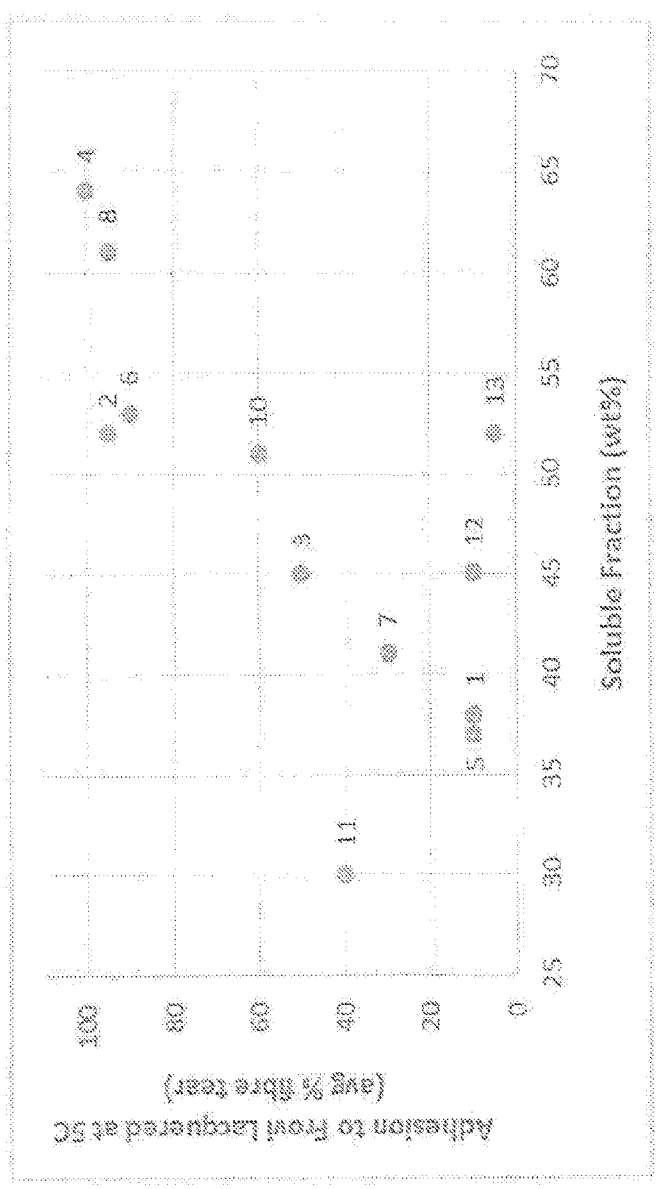
FIG. 5 shows that high adhesion is obtained when the soluble fraction accounts for at least 50 weight percent of the polymer.

FIG. 4 shows that some specific and novel polymer designs can be used to achieve a balanced level of adhesion and setting speed.

TABLE 1

| Sample | Ethylene (wt. %) | Hf (J/g) | Mw (kg/mol) | MWD | First Fraction (wt. %) | Second Fraction (wt. %) | Third Fraction (wt. %) | Elution Temperature (° C.) | Set Time (sec) | Adhesion Seyfert, 23° C. | Adhesion Seyfert, 5° C. | Adhesion Frovi, 5° C. |
|---|---|---|---|---|---|---|---|---|---|---|---|---|
| 1 | 5.1 | 47 | 30 | 4.2 | 38 | 31 | 27 | 81 | 3 | >80 | 50 < <80 | 10 |
| 2 | 7.5 | 48 | 31 | 3.7 | 52 | 7 | 29 | 81 | 4 | >80 | >80 | 95 |
| 3 | 5.7 | 41 | 30 | 4.1 | 45 | 30 | 21 | 81 | 3.5 | >80 | 50 < <80 | 50 |
| 4 | 8.8 | 31 | 31 | 3.8 | 64 | 4 | 21 | 80 | 6 | >80 | >80 | 100 |
| 5 | 6.2 | 54 | 32 | 3.2 | 37 | 24 | 32 | 86 | 2.5 | >80 | <50 | 10 |
| 6 | 8 | 47 | 33 | 3.3 | 53 | 6 | 33 | 87 | 3 | >80 | >80 | 90 |
| 7 | 6.5 | 47 | 33 | 3.2 | 41 | 28 | 25 | 86 | 4 | >80 | 50 < <80 | 30 |
| 8 | 8.9 | 37 | 33 | 3 | 61 | 3 | 25 | 87 | 4 | >80 | >80 | 95 |
| 9 | 6.3 | 39 | | 2.2 | | | | | 5 | >80 | <50 | 5 |
| 10 | 7.4 | 40 | 33 | 2.2 | 51 | 12 | 35 | 74 | 4 | >80 | >80 | 60 |
| 11 | 7.2 | 44 | 31 | 2 | 30 | 42 | 25 | 67 | 3.5 | >80 | 50 < <80 | 40 |
| 12 | 7.2 | 51 | 32 | 2.2 | 45 | 16 | 33 | 86 | 3 | >80 | <50 | 10 |
| 13 | 5 | 43 | 33 | 2.1 | 52 | 17 | 25 | 85 | 3.5 | >80 | 50 < <80 | 5 |

TABLE 2

| Example | 14 | 15 | 16 | 17 | 18 | 19 | 20 | 21 | 22 | 23 | 24 | 25 |
|---|---|---|---|---|---|---|---|---|---|---|---|---|
| Polymer from Sample 10 | 65 | 65 | 65 | 65 | 65 | 65 | 65 | 65 | 65 | | | 65 |
| Polymer A | | | | | | 20 | | | | 65 | 65 | |
| Tackifier A | | | | | | | | | | | | |
| Tackifier B | 20 | 20 | 20 | 20 | | | | 20 | 20 | 20 | 20 | 20 |
| Tackifier C | | | | | 20 | | | | | | | |
| Tackifier D | | | | | | | 20 | | | | | |
| Wax A | 14.4 | | | 7.2 | 7.2 | 7.2 | 7.2 | 7.2 | 7.2 | 7.2 | 7.2 | 5.7 |
| Wax B | | 14.4 | | | | | | | | | | |
| Wax C | | | 14.4 | 7.2 | 7.2 | 7.2 | 7.2 | 7.2 | 7.2 | 7.2 | 7.2 | 5.7 |

TABLE 2-continued

| Example | 14 | 15 | 16 | 17 | 18 | 19 | 20 | 21 | 22 | 23 | 24 | 25 |
|---|---|---|---|---|---|---|---|---|---|---|---|---|
| Wax D | | | | | | | | | | | | 3 |
| Nucleating agent 1 | | | | | | | | 0.1 | | | | |
| Nucleating agent 2 | | | | | | | | | 0.1 | | | |
| Stabilizer | 0.6 | 0.6 | 0.6 | 0.6 | 0.6 | 0.6 | 0.6 | 0.5 | 0.5 | 0.5 | 0.6 | 0.6 |
| TOTAL | 100 | 100 | 100 | 100 | 100 | 100 | 100 | 100 | 100 | 100 | 100 | 100 |
| Softening point (° C.) | 116 | 118 | 132 | 126 | 127 | 126 | 126 | 180 | 126 | 137 | 126 | 128 |
| Viscosity @ 180° C. | 985 | 1140 | 1275 | 1125 | 1002 | 1120 | 1100 | 1135 | 1123 | 890 | 885 | 1192 |
| Heat resistance (° C.) | 60 | 63 | 43 | 62 | 54 | 66 | 54 | 51 | 70 | 75 | 66 | 53 |
| Adhesion to cardboard (Room Temperature) | 0 | 70 | 100 | 0 | 0 | 3 | 0 | 93 | 0 | 0 | 0 | 3 |
| Adhesion to Frovi 250 (Room Temperature) | 10 | 97 | 100 | 97 | 97 | 90 | 67 | 100 | 77 | 100 | 7 | 63 |
| Adhesion to Frovi Lacquered (Room Temperature) | 10 | 7 | 7 | 10 | 10 | 100 | 97 | 7 | 10 | 7 | 10 | 93 |
| Setting speed (Kanebo tester, Time to 90% fibre tear) | 8.5 | 8.5 | 19 | 6.5 | 5.5 | 4.6 | 4.5 | 4.6 | 5.5 | 4.5 | 5 | 6 |

Examples in table 2 show the effect of formulation ingredients on performance. Examples 14, 15, 16 and 25 show the effect of changes in the type of wax. Examples 17 to 20 show the effect of different types of tackifiers. Examples 21, 22 and 23 show the effect of adding nucleating agents. Examples 23 and 24 are comparative examples which show the effect of using a C3/C6 copolymer (Linxar 128).

Polymer A (Linxar 128) is a multimodal C3/C6 copolymer (enthalpy of fusion: 45 J/g, Mw: 40000 g/mol, MWD: 3.4, soluble fraction: 24 weight %, second fraction: 54 weight % and third fraction: 22% eluting at 80° C.). Tackifier A is an hydrocarbon tackifier (C5 based, Softening point: 94° C.), tackifier B, an hydrocarbon tackifier (DCPD, dicyclopentadiene based, Softening point: 103° C., aliphatic), tackifier C is an hydrocarbon tackifier (DCPD based, Softening point: 103° C., aromatic modified) and tackifier D is an hydrocarbon tackifier (C9 based, Softening point: 100° C., partially hydrogenated). Wax A is a Fischer-Tropsch wax (Dropping point: 110° C., Viscosity at 140° C. <100 mPas), wax B is a polyethylene wax (Dropping point: 110° C., Viscosity at 140° C. <100 mPas), wax C is a polypropylene wax (Dropping point: 145° C., Viscosity at 170° C.: <100 mPas) and wax D is maleic anhydride (MaH) grafted polypropylene wax (Dropping point: 141° C., visco at 190: <200 mPas, saponification number. mgKOH/g: 50). Nucleating Agent 1 is a blend of zinc stearate and the calcium salt of a cyclic carboxylic acid; and Nucleating Agent 2 is a sorbitol-derivative based clarifying agent proprietary to Adeka Corporation from their ADK STAB-NA series. The stabilizer is a primary antioxidant (sterically hindered phenolic antioxidant).

The different examples illustrate variations in performance level and the impact that some additives can have on different performances.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

While the foregoing is directed to embodiments of the present disclosure, other and further embodiments of the disclosure may be devised without departing from the basic scope thereof, and the scope thereof is determined by the claims that follow.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A multi-modal polymer blend of at least three fractions as determined by Temperature Rising Elution Fractionation, said blend comprising:
   a first propylene-based polymer, wherein the first propylene-based polymer is a homopolymer of propylene or a copolymer of propylene and at least one member selected from the group consisting of ethylene and a C4 to C20 alpha-olefin;

a second propylene-based polymer, wherein the second propylene-based polymer is a homopolymer of propylene or a copolymer of propylene and at least one member selected from the group consisting of ethylene and a C4 to C20 alpha-olefin; wherein the second propylene-based polymer is different than the first propylene-based polymer; and a third propylene-based polymer, wherein the third propylene-based polymer is a homopolymer of propylene or a copolymer of propylene and at least one member selected from the group consisting of ethylene and a C4 to C20 alpha-olefin; wherein the third propylene-based polymer is different than the first propylene-based polymer and the second propylene-based polymer;

wherein the multi-modal polymer blend has a Mw of about 5000 g/mol to about 250,000 g/mol; and wherein, when subjected to Temperature Rising Elution Fractionation, the multi-modal polymer blend exhibits:

a first fraction that is soluble at −15° C. in xylene, the first fraction having an isotactic (mm) triad tacticity of about 55 mol % to about 85 mol %;

a second fraction that is insoluble at −5° C. in xylene or dichlorobenzene and soluble at 40° C. in xylene or dichlorobenzene, and a third fraction that is insoluble at 70° C. in xylene or dichlorobenzene, the third fraction having an isotactic (mm) triad tacticity of about 85 mol % to about 98 mol %.

2. The multi-modal polymer blend according to claim 1, which has a first fraction that is soluble at −15° C. accounting for at least 50 weight % of the multi-modal polymer.

3. The multi-modal polymer blend according to claim 1, which has a Mw of about 10,000 g/mol to about 150,000 g/mol.

4. The multi-modal polymer blend according to claim 1, which has a Mw of about 20,000 g/mol to about 60,000 g/mol.

5. The multi-modal polymer blend according to claim 1, which has a MWD of about 1.8 to about 3.5.

6. The multi-modal polymer blend according to claim 1, which has a MWD of about 1.9 to about 3.2.

7. The multi-modal polymer blend according to claim 1, which has a MWD of about 2.0 to about 3.0.

8. The multi-modal polymer blend according to claim 1, which is a three reactor blend.

9. The multi-modal polymer blend according to claim 1, which is a solution blend.

10. The multi-modal polymer blend according to claim 1, which is in the form of polymeric pellet.

11. The multi-modal polymer blend according to claim 1, wherein the first propylene-based polymer comprises a copolymer of propylene and ethylene, the second propylene-based polymer comprises a copolymer of propylene and ethylene, and the third propylene-based polymer comprises a copolymer of propylene and ethylene.

12. A hot melt adhesive composition which comprises:
1) about 40 to about 97% by weight of the multi-modal polymer blend according to claim 1;
2) about 1 to about 30% by weight of at least one tackifier;
3) about 1 to about 30% by weight of at least one wax;
4) optionally about 0.01 to about 0.5% by weight of at least one nucleating agent; and
5) optionally about 0.01% by weight to 5% by weight of at least one plasticizer,
wherein the % by weight is based on the total weight of the hot melt adhesive composition.

13. The hot melt adhesive composition according to claim 12, wherein the multi-modal polymer blend has a MWD of about 1.8 to about 3.5.

14. The hot melt adhesive composition according to claim 12, which further comprises an antioxidant present in an amount of about 0.01 to about 1 wt. % of the hot melt adhesive composition.

15. An article comprising at least one substrate and a hot melt composition according to claim 12.

16. The article according to claim 15, wherein the article comprises a first substrate and a second substrate, wherein the first substrate and a second substrate are bonded together by the hot melt adhesive composition, being interposed between the first substrate and a second substrate.

17. The article according to claim 15, wherein the article is used for packaging, straw attachment, spout bonding, bag closing, heat sealing, coating, bookbinding and filter assembly applications.

18. A method for manufacturing an article according to claim 15, which comprises
(1) heating the hot melt adhesive composition to a temperature where it is completely molten;
(2) applying the hot melt adhesive composition to at least one surface of a first substrate to form an adhesive layer on the at least one surface of the first substrate, wherein said at least one surface is partly or completely covered by the adhesive layer; and
(3) solidifying the adhesive layer by actively cooling it or allowing it to cool to room temperature.

19. The method according to claim 18, wherein after step (2), a second substrate is brought into contact with the hot melt adhesive layer on the first substrate.

20. The method according to claim 18, wherein after step (3), the surface of the adhesive is remelted ("reactivated") and a second substrate is brought into contact with the hot melt adhesive layer on the first substrate and cooled by actively cooling or allowing it to cool to room temperature.

* * * * *